(12) United States Patent
Porter

(10) Patent No.: US 10,804,997 B2
(45) Date of Patent: Oct. 13, 2020

(54) APPARATUS AND METHOD FOR GENERATING AND CAPTURING A TRANSMISSION WAVE AND APPARATUS AND METHOD FOR TRANSMITTING AND RECEIVING DIGITAL INFORMATION

(71) Applicant: CTwists, LLC, Colorado Springs, CO (US)

(72) Inventor: Carl Edmund Porter, Colorado Springs, CO (US)

(73) Assignee: Ctwists, LLC, Colorado Springs, CO (US)

( * ) Notice: Subject to any disclaimer, the term of this patent is extended or adjusted under 35 U.S.C. 154(b) by 0 days.

(21) Appl. No.: 15/892,939

(22) Filed: Feb. 9, 2018

(65) Prior Publication Data
US 2018/0262261 A1 Sep. 13, 2018

Related U.S. Application Data

(60) Provisional application No. 62/457,758, filed on Feb. 10, 2017.

(51) Int. Cl.
| | |
|---|---|
| H04B 7/10 | (2017.01) |
| H04B 7/12 | (2006.01) |
| H01Q 21/26 | (2006.01) |
| H01Q 19/10 | (2006.01) |
| H01Q 13/02 | (2006.01) |
| H01Q 1/24 | (2006.01) |
| H01Q 21/24 | (2006.01) |

(52) U.S. Cl.
CPC .............. *H04B 7/10* (2013.01); *H01Q 1/247* (2013.01); *H01Q 13/02* (2013.01); *H01Q 19/10* (2013.01); *H01Q 21/24* (2013.01); *H01Q 21/26* (2013.01); *H04B 7/12* (2013.01)

(58) Field of Classification Search
CPC ........ H01Q 21/24; H01Q 1/247; H01Q 13/02; H01Q 19/10; H01Q 21/26; H04B 7/10; H04B 7/12
See application file for complete search history.

(56) References Cited

U.S. PATENT DOCUMENTS

| | | | | |
|---|---|---|---|---|
| 4,588,993 A | * | 5/1986 | Babij ................. | G01R 29/0878 324/72.5 |
| 6,031,483 A | * | 2/2000 | Urabe .................... | G01S 7/354 342/128 |
| 6,172,632 B1 | | 1/2001 | Carter, IV | |

(Continued)

OTHER PUBLICATIONS

WO PCT/US2018/017619 search rept., dated May 17, 2018, Porter, Carl Edmund.

(Continued)

*Primary Examiner* — Jean B Corrielus
(74) *Attorney, Agent, or Firm* — Wells St. John P.S.

(57) ABSTRACT

An apparatus is provided for generating a transmission wave. The apparatus includes a plurality of antennas and a plurality of signal generators. The plurality of antennas has polarization diversity. The plurality of signal generators are each coupled to one of the antennas and configured to generate a continuous twisted wave by driving each of the antennas using independent, coordinated, and distinct sinusoidal waves, and having a twist frequency and a carrier frequency, the twist frequency lower than the carrier frequency. A method is also provided.

45 Claims, 40 Drawing Sheets

(56) References Cited

U.S. PATENT DOCUMENTS

| | | | |
|---|---|---|---|
| 6,204,810 B1 | 3/2001 | Smith et al. | |
| 6,271,790 B2 | 8/2001 | Smith et al. | |
| 6,295,025 B1 | 9/2001 | Smith et al. | |
| 6,317,097 B1 | 11/2001 | Smith et al. | |
| 6,340,950 B1 | 1/2002 | Smith et al. | |
| 6,393,265 B1 | 5/2002 | Smith et al. | |
| 6,570,536 B2 | 5/2003 | Smith et al. | |
| 9,094,265 B1 | 7/2015 | Sagisaka | |
| 9,853,799 B2 | 12/2017 | Dutronc et al. | |
| 2002/0018483 A1 | 2/2002 | Kuwabara et al. | |
| 2002/0057218 A1* | 5/2002 | Smith | H04B 7/10 342/365 |
| 2002/0192492 A1 | 12/2002 | Abys et al. | |
| 2004/0218933 A1 | 11/2004 | Fludger et al. | |
| 2006/0046773 A1 | 3/2006 | Aycin et al. | |
| 2006/0195162 A1* | 8/2006 | Arx | A61N 1/37223 607/60 |
| 2007/0112397 A1 | 5/2007 | Crivelli | |
| 2007/0230328 A1* | 10/2007 | Saitou | H04L 1/22 370/210 |
| 2009/0007185 A1* | 1/2009 | Nix | H04B 7/10 725/62 |
| 2009/0300454 A1* | 12/2009 | Miyoshi | H04B 7/0671 714/748 |
| 2011/0317582 A1* | 12/2011 | Han | H04B 7/024 370/252 |
| 2012/0082264 A1 | 4/2012 | Shen | |
| 2013/0120194 A1* | 5/2013 | Knadle | H01Q 9/285 343/700 MS |
| 2013/0170530 A1* | 7/2013 | Yoshikawa | H04B 7/0682 375/224 |
| 2013/0265199 A1* | 10/2013 | Koskiniemi | G01S 19/14 342/450 |
| 2013/0336417 A1 | 12/2013 | Takei | |
| 2014/0225798 A1 | 8/2014 | Huber et al. | |
| 2014/0269873 A1 | 9/2014 | Tahir et al. | |
| 2016/0182185 A1 | 6/2016 | Takei | |

OTHER PUBLICATIONS

WO PCT/US2018/017619 writ. opin., dated May 17, 2018, Porter, Carl Edmund.

* cited by examiner

Circular Wave – 2 Crossed Dipoles $x = \cos(2*\pi*f_c*t+\theta)$
$y = \sin(2*\pi*f_c*t+\theta)$ Super Circular Wave – 3 Orthogonal antennas $x = \cos(2*\pi*f_c*t+\theta)$
$y = \cos(2*\pi*f_c*t+\theta+\pi*2/3)$
$z = \cos(2*\pi*f_c*t+\theta+\pi*4/3)$ CTwists Simple Wave – 2 Crossed Dipoles $x = \frac{1}{2} * (\cos(2*\pi*t*(f_c+f_t) + (\theta+\lambda)) + \cos(2*\pi*t*(f_c-f_t) + (\theta-\lambda)))$
$y = \frac{1}{2} * (\sin(2*\pi*t*(f_c+f_t) + (\theta+\lambda)) - \sin(2*\pi*t*(f_c-f_t) + (\theta-\lambda)))$ CTwists Complex Wave – 3 Orthogonal antennas $x = \frac{1}{2}*\cos(2*\pi*t(f_c+f_t)+(\theta+\lambda))+\frac{1}{2}*\cos(2*\pi*t(f_c-f_t)+(\theta-\lambda))$
$y = \frac{1}{2}*\cos(2*\pi*t(f_c+f_t)+(\theta+\lambda+\pi*2/3))+\frac{1}{2}*\cos(2*\pi*t(f_c-f_t)+(\theta-\lambda-\pi*2/3))$
$z = \frac{1}{2}*\cos(2*\pi*t(f_c+f_t)+(\theta+\lambda+\pi*4/3))+\frac{1}{2}*\cos(2*\pi*t(f_c-f_t)+(\theta-\lambda-\pi*4/3))$

FIG. 2

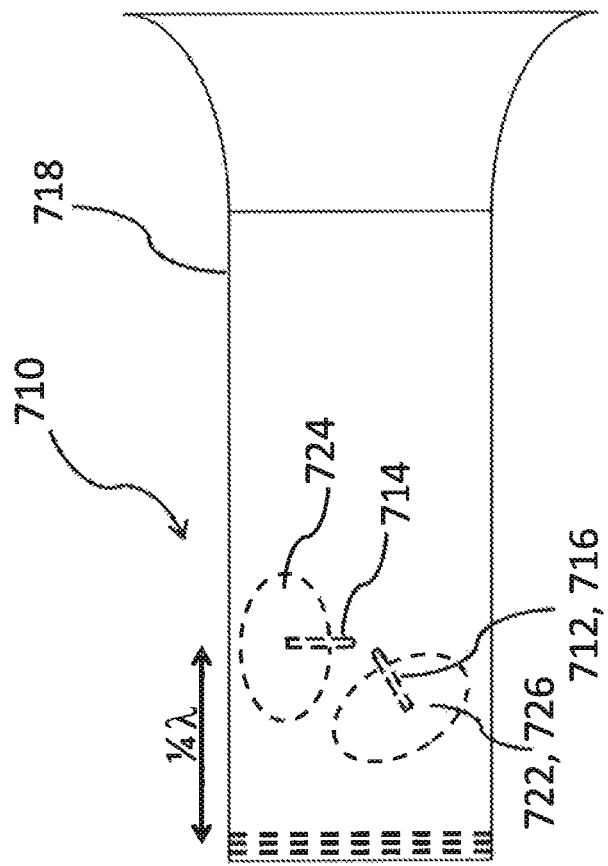
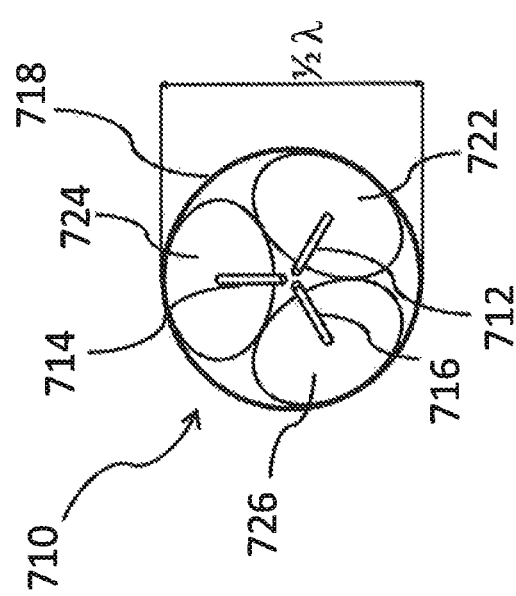
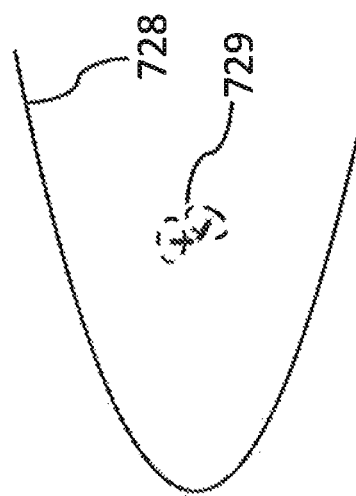
FIG. 18B
FIG. 18A
FIG. 18C

| FFT Attributes | Option 1 | Option 2 | Option 3 | Total | 802.11n | Ratio | Super Circular | Ratio |
|---|---|---|---|---|---|---|---|---|
| FFT - n | 16 | 16 | 16 | | | | 16 | |
| # Bins | 32,768 | 32,768 | 32,768 | | | | 32,768 | |
| FR Size | 1,024 | 512 | 256 | | | | 1,024 | |
| FFT Size | 65,536 | 65,536 | 65,536 | | | | 65,536 | |
| Max Freq | 33,554,432 | 16,777,216 | 8,388,608 | | | | 33,554,432 | |
| Sample Rate | 67,108,864 | 33,554,432 | 16,777,216 | | | | 67,108,864 | |
| # of Samples | 65,536 | 65,536 | 65,536 | | | | 65,536 | |
| Twist Freq | 8,388,608 | 4,194,304 | 2,097,152 | | | | 10,485,760 | |
| Min Carrier Freq | 12,582,400 | 6,291,200 | 3,145,600 | | | | 4,193,792 | |
| Max Carrier Freq | 16,776,704 | 8,388,352 | 4,194,176 | | | | 25,165,312 | |
| Min Low Peak | 4,193,792 | 2,096,896 | 1,048,448 | | | | | |
| Max Low Peak | 8,388,096 | 4,194,048 | 2,097,024 | | | | | |
| Min High Peak | 20,971,008 | 10,485,504 | 5,242,752 | | | | | |
| Max High Peak | 25,165,312 | 12,582,656 | 6,291,328 | | | | | |
| # of Channels | 819 | 819 | 819 | 2,457 | 1 | 2457 | 4,096 | 4,096 |
| Freq Range | 20,972,544 | 10,486,272 | 5,243,136 | | | | 20,972,544 | |
| Wobble Freq | 262,144 | 131,072 | 65,536 | | | | 327,680 | |
| Data Rate | 2,097,152 | 1,048,576 | 524,288 | | | | 2,621,440 | |
| Total Data Rate-Mbs | 1,638 | 819 | 410 | 2,867 | 54 | 53 | 10,240 | 193 |
| Hole Size | 12,582,912 | 6,291,456 | 3,145,728 | | | | | |
| Channel Width / Mbs | | | | 7,316 | 370,370 | 51 | 2,048 | 180 |
| Power dB | | | | -126 | -109 | 17 | -132 | 23 |

FIG. 28

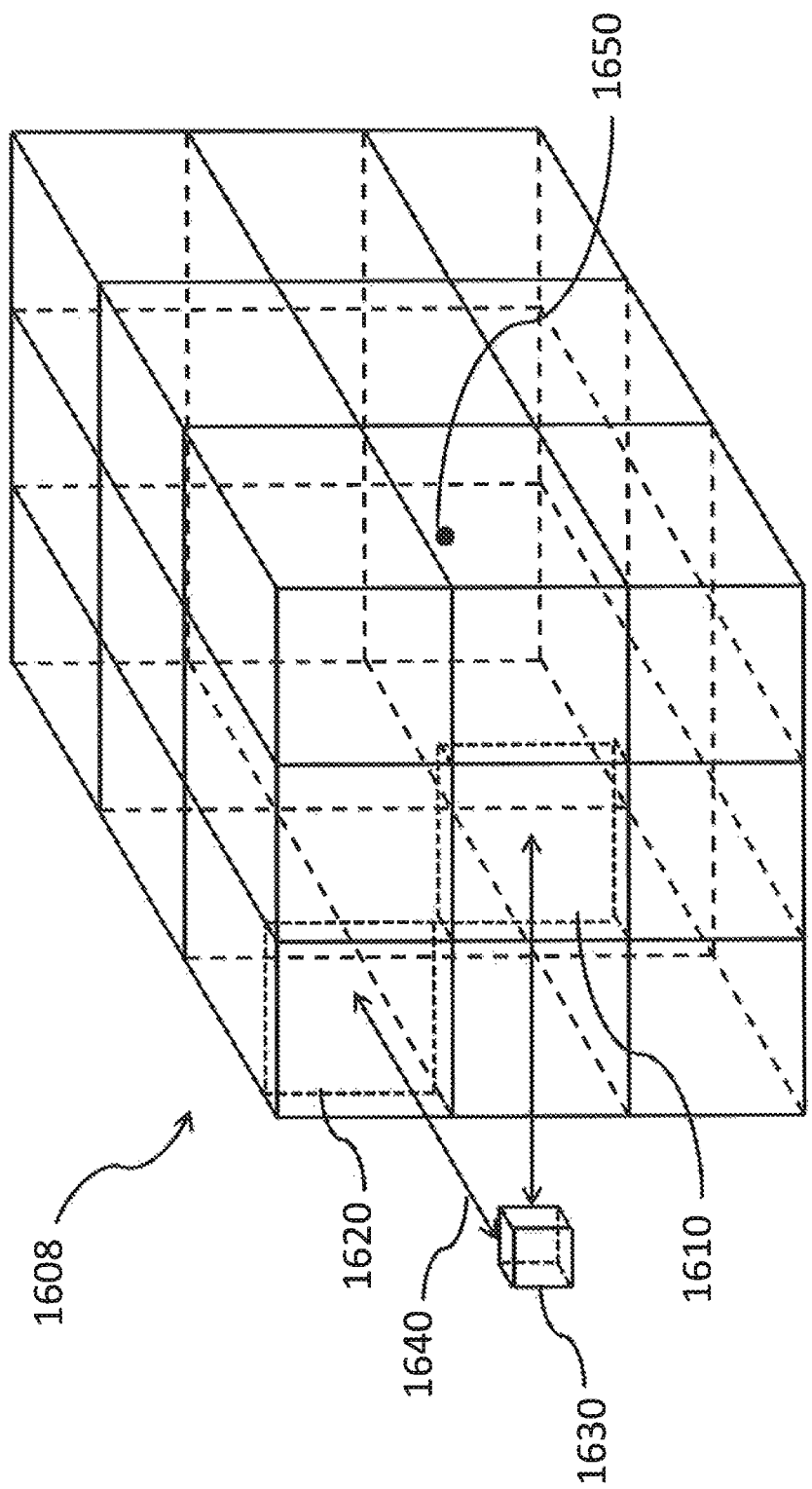

APPARATUS AND METHOD FOR GENERATING AND CAPTURING A TRANSMISSION WAVE AND APPARATUS AND METHOD FOR TRANSMITTING AND RECEIVING DIGITAL INFORMATION

CROSS REFERENCE TO RELATED APPLICATION

This patent resulted from U.S. Provisional Patent Application Ser. No. 62/457,758, which was filed on Feb. 10, 2017, and which is hereby incorporated by reference.

TECHNICAL FIELD

Examples disclosed herein are generally related to wireless information transmission and reception, and more particularly related to systems and methods for communicating digital information over radio frequency waves and detection and manipulation of substance using radio waves.

BACKGROUND OF THE DISCLOSURE

It was previously known to use radio wave communication with crossed dipoles to communicate from sensors in corn fields to collection stations, as shown in U.S. Pat. Nos. 6,271,790; 6,204,810; and 6,570,536. This prior effort is known as eSpin. The lower power requirement and better penetration was validated in this practical application. During prototype testing of this communications system, two major findings occurred. First, there was an observed 30 dB to 42 dB improvement in signal selectivity out of noise. This finding was measured, but not understood. Secondly, using different spin frequencies, three or more streams of video could be multiplexed on the same frequency range, but on de-spin the streams were merged together. The wave suppressed the carrier and communicated on both side bands. This produced a ribbon in three dimensions that communicated over a wide frequency spectrum. The wide spectrum of frequencies used by such technique is not compatible with the way the FCC allocates frequency spectrum and may interfere with legacy radio waves.

It was also previously known to use radio wave communication using a twisted wave technology with Orbital Angular Momentum (OAM), as shown in U.S. Pat. No. 9,853,799. Such twisted wave technology depends on the different shape of the wave front to encode data. However, OAM does not register on normal radio devices. These waves are not visible to normal methods which are based upon sinusoidal waves that register on a Fast Fourier Transform (FFT). OAM requires very specialized equipment for transmission and reception and with only a small antenna misalignment, the reception fails. The wide spectrum of frequencies used by OAM is not compatible with the way the FCC allocates frequency spectrum and may interfere with legacy radio waves.

Further previously known techniques involve narrow banding communication. In one early form, radio narrow band communication was done with Continuous Wave (CW) communication of Morse code. It was limited in speed by the human operator's ability to receive and record the Morse code encoded information. Typically a maximum of 18 to 20 words per minute was communicated. It is characterized as on off keying (OOK) which is limited in speed since side bands are created when the signal is turned on and off rapidly. In another form, radio teletype (RTTY) provided digital communication which communicated "mark" and "space" information encoded in two different analog tones which used Single Side Band (SSB) to transmit the two audio tones to produce audio-frequency shift keying (AFSK). At this point the communication was no longer narrow band. The changes in tones or frequencies created side band noise. The next effort was Gaussian frequency-shift keying (GFSK) which made transitions smoother, reduced the required power, and reduced intersymbol interference. The next effort to reduce side band creation was Minimum-shift keying (MSK) which reduced the frequency difference between the "mark" and "space" frequencies. That was then improved to Gaussian minimum shift keying (GMSK) which smoothed the transition between the frequencies and is used in Global System for Mobile Communications (GSM) for cellular phone technology.

Management techniques are also previously known. Cellular networks currently provide service to a portion of the world's population using very limited radio frequency resources. There exists a need for consistent reliable secure service for both cell phones and rural Internet, and there is a growing need for enhanced service capabilities due to the advent of self-driving vehicles.

Detection of substances has previously been done using radio waves based upon the nucleus spin change for nitrogen in a magnetic field, in some cases the earth's magnetic field. This radio frequency range ended up in the AM radio band and turned out to be of limited value. The rotational and vibrational frequencies of some substances are known and used, such as water's natural vibration frequency (about 2.4 GHz), and these vibration frequencies make a microwave oven work. However, the use of radio frequency substance detection has been very limited. In the radio frequency range from a 10 kHz to 100 GHz, there are so many excitation frequency lines that the normal methods for using them to distinguish substances are not practical. Accordingly, there exists a need for further improvements.

SUMMARY

An apparatus and method are provided for generating and capturing a transmission wave, and an apparatus and method are provided for transmitting and receiving digital information. The apparatus and method can be implemented to ultra-narrow band communication, communication management, and substance detection and manipulation.

According to one aspect, an apparatus is provided for generating a transmission wave. The apparatus includes a plurality of antennas and a plurality of signal generators. The plurality of antennas has polarization diversity. The plurality of signal generators are each coupled to one of the antennas and configured to generate a continuous twisted wave by driving each of the antennas using independent, coordinated, and distinct sinusoidal waves, and having a twist frequency and a carrier frequency, the twist frequency lower than the carrier frequency.

According to another aspect, an apparatus is provided for capturing a transmission wave. The apparatus includes a plurality of antennas and a plurality of fast fourier transform (FFT) analyzers. The plurality of antennas has polarization diversity. The plurality of fast fourier transform (FFT) analyzers are each coupled to one of the antennas, the antennas configured to capture a continuous twisted wave by driving each of the antennas using independent, coordinated, and distinct sinusoidal waves, and having a twist frequency and a carrier frequency, the twist frequency lower than the carrier frequency.

According to yet another aspect, an apparatus is provided for transmitting digital information. The apparatus includes a plurality of antennas and a plurality of signal generators. The plurality of antennas has polarization diversity. The plurality of signal generators is each coupled to one of the antennas and configured to: a) drive the antennas to generate a transmission wave comprising a continuous twisted wave having a carrier frequency and a twist frequency lower than the carrier frequency; and b) encode digital information on the continuous twisted wave by shifting the carrier wave between a first carrier frequency and a second carrier frequency.

According to even another aspect, an apparatus is provided for receiving digital information. The apparatus includes a plurality of antennas and a plurality of signal receivers. The plurality of antennas has polarization diversity. The plurality of signal receivers each has an FFT processor, each signal receiver coupled to one of the antennas, the plurality of antennas and signal receivers configured to receive a captured wave comprising a continuous twisted wave having a carrier frequency and a twist frequency lower than the carrier frequency as an output signal from each of the antennas to decode digital information on the continuous twisted wave in the form of shifts between a first carrier frequency and a second carrier frequency.

According to a further aspect, a method is provided for creating a transmission wave. The method includes: providing a plurality of antennas having polarization diversity between the antennas; and generating a continuous twisted wave having a twist frequency and a carrier frequency, the twist frequency lower than the carrier frequency, by driving each of the antennas using independent, coordinated, and sinusoidal waves.

According to a yet even further aspect, a method is provided for transmitting digital information. The method includes: generating a transmission wave comprising a continuous twisted wave having a carrier frequency and a twist frequency lower than the carrier frequency; and encoding digital information on the continuous twisted wave by shifting the carrier frequency between a first carrier frequency and a second carrier frequency; wherein shifting comprises smoothly transitioning between the first carrier frequency and the second carrier frequency with phase adjustment in a manner that maintains power transition such that as one of the first and second frequencies drops power to zero another of the first and second frequencies brings its power up so that the total power stays the same.

BRIEF DESCRIPTION OF THE DRAWINGS

Exemplary embodiments of the various disclosures are described below with reference to the following accompanying drawings. The drawings may be considered to represent scale.

FIG. 2 is the list of formulas used to create circular, "Super Circular", CTwists, and "Complex CTwists" waves;

FIGS. 18A and 18B are outlet end view and side view of a horn three orthogonal antenna system, and FIG. 18C is a side view of an optional parabolic three orthogonal antenna system;

FIG. 28 is the table of FFT options;

FIG. 37 is an example substance detection chamber;

DETAILED DESCRIPTION OF THE EMBODIMENTS

Figure 1:
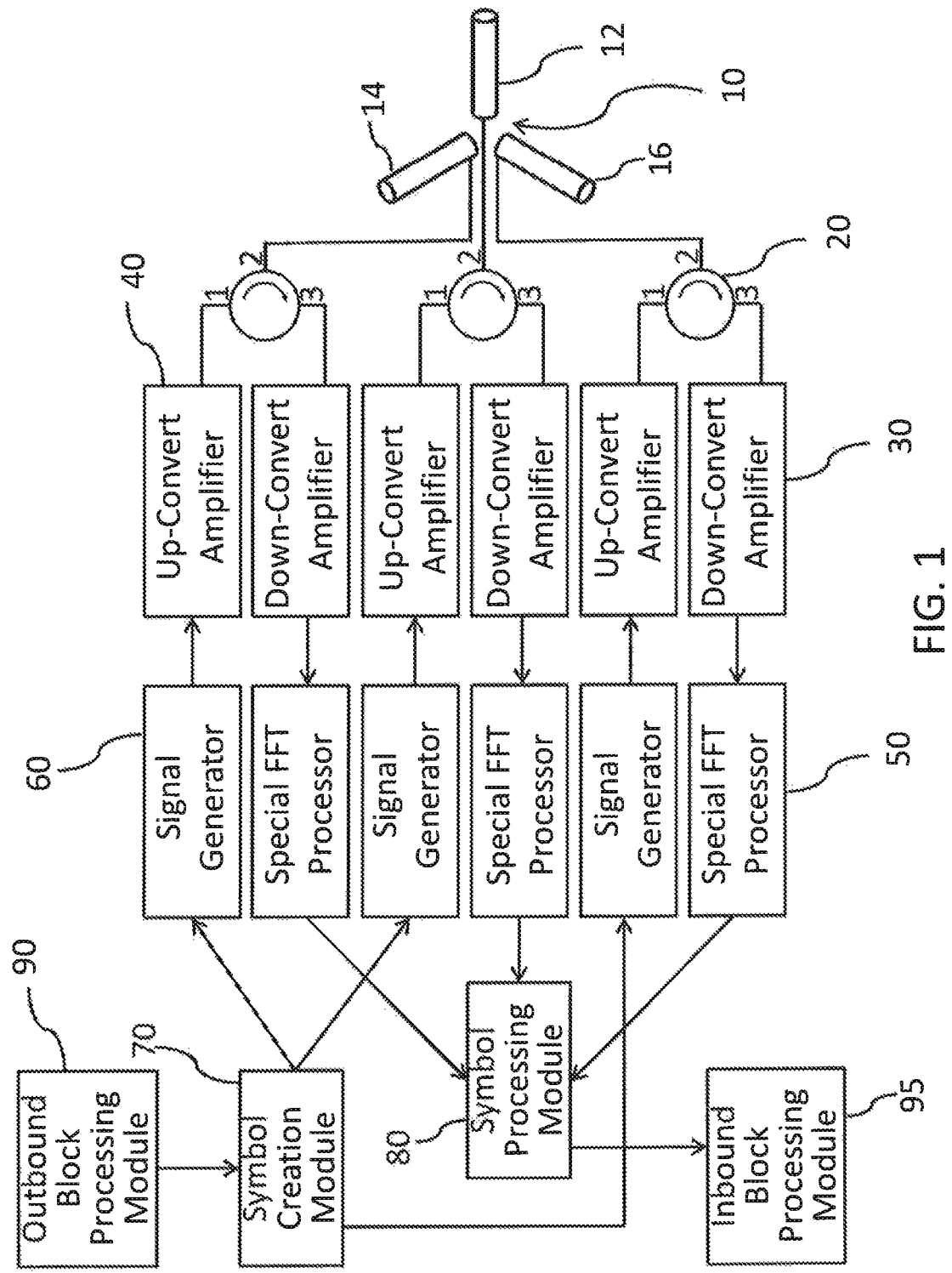
FIG. 1 shows the block diagram of a potential apparatus used to send and receive data communicating with CTwists waves.

This disclosure of the invention is submitted in furtherance of the constitutional purposes of the U.S. Patent Laws "to promote the progress of science and useful arts" (Article 1, Section 8).

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

As used herein, the term CTwists is understood to mean the use of radio waves twisted at a frequency lower than the carrier frequency created through antennas with polarization diversity and directly driven with separate electronic sections in coordination.

As used herein, the term eSpin is understood to mean the communication system described in U.S. Pat. Nos. 6,271,790; 6,204,810; and 6,570,536.

As used herein, the term "Super Circular Polarized Waves" is understood to mean the set of circular and elliptical polarized waves created by three orthogonal antennas.

As used herein, the term twist (as in twist frequency) is understood to mean the rotation of the carrier frequency one complete rotation or for non-CTwists waves—it means the average carrier frequency for the subject frequency range.

As used herein, the term Wobble is understood to mean a defined set of twists (in the example herein, it is 32 twists).

As used herein, the term sinusoidal is understood to mean waves generated through combinations of sine and cosine functions.

As used herein, the term Smooth Transition is understood to mean a defined set of twists (in the example herein, it is 4 twists) used as a transition to a new frequency is desired to reduce the power of the current frequency to zero while increasing the target frequency from zero to the target power level. This is done keeping the total power level constant.

As used herein, the term Skew is understood to mean a time difference from the start of a Wobble to the actual Wobble measurement (sampling window).

Throughout this disclosure, headings and/or subheadings are provided in the detailed disclosure for convenience and are not provided for interpretation.

The present disclosure (CTwists) relates, in general, to digital radio communications system and method, namely a system and method for communicating digital information over radio frequencies (including frequencies from a few KHz to hundreds of GHz) with a decrease power requirement, greater distance, greater number of channels, greater data throughput, and less interference with legacy communication. The CTwists wave shows great promise in detecting and manipulating substances. Analysis of the CTwists Complex Wave projects the following improvements over the 802.11n 2.4 GHz waves:

TABLE 1

| Complex CTwists Wave Attributes | | |
|---|---|---|
| Attribute | Advantage | Source |
| Less Power or Greater Distance | 30 to 42 dB | eSpin Tests |
| | 17 dB | Narrow Band Model |
| More Channels | 50 Times | Narrow Band Model |
| Data Throughput | 50 Times | Narrow Band Model |

TABLE 1-continued

| Complex CTwists Wave Attributes | | |
|---|---|---|
| Attribute | Advantage | Source |
| Better Penetration | 6 Times | eSpin Tests |
| Less Interference | TBD | Wave Analysis |

CTwists is a major breakthrough in digital radio communication and substance detection and manipulation. CTwists will be explained in the following sections:
I. CTwists Wave Generation
II. Ultra-Narrow Band Communication
III. Special FFT Processing
IV. Communication Management
V. Substance Detection and Manipulation I. CTwists Wave Generation CTwists is similar to the prior analog eSpin technology in that both eSpin and the CTwists use radio waves rotated at frequencies lower than the carrier's frequency. However, the CTwists differs from eSpin in that eSpin suppressed the carrier (two peaks) and transmits its analog data over its side bands and CTwists creates almost no side bands and transmits its digital data using its two carrier peaks. The method of creation of the rotated wave and reception of the rotated wave also differ.

CTwists can be advantageously exploited, in general, in all kinds of radio communication, and in particular, in rural Internet delivery, Wi-Fi, cellular, Internet of Things (IOT), and satellite communications. Furthermore, the present apparatus and method for generating and capturing a transmission wave, as well as the present apparatus and method for transmitting and receiving digital information has application in the fields of substance detection and medical diagnostics and treatment.

FIG. 1 is a block diagram of an apparatus used to send and receive communication using CTwists waves, according to one aspect. An array 10 of antennas 12, 14, and 16 with polarization diversity communicates with individual circulators 20 that are used to isolate, transmit, and receive signals. A receive down-converter and amplifier, or down-convert amplifier 30 is shown and includes a Digital Down-Converter (DDC). Optionally, a mixer and an intermediate frequency (IF) device, or module can be used. A transmit up-convert amplifier 40 is implemented using a Direct Digital Synthesizer (DDS). Optionally, a mixer and IF device, or module can be used. A special FFT processor 50 is configured to slice the input based upon knowing the periodic nature of the wave for selective sampling. A complex sinusoidal signal generator 60 implements one of the four sets of equations shown below with reference to FIG. 2 in order to transmit a signal over a wave. A symbol creation module 70 is configured to break the symbol into a Wobble that transmits the digital information. A symbol processing module 80 is configured to merge the Wobble decode from the plurality of special FFT processors 50 to find consensus on the symbol. Consensus is found in analyzing the results from the FFT results from each of the two peaks for each antenna for the wobble. For the complex CTwists wave, six votes are delivered to the decision maker. At least two votes need to agree on a wobble value without an equal counter opinion. The strongest opinion will be used unless there is a tie. A tie is indicated as an error. An outbound block processing module 90 is configured to break outbound data into sets of Forward Error Recovery blocks and feed those blocks symbol by symbol to the symbol creation module 70. In operation, an inbound block processing module 95 is configured to receive symbols from the symbol processing module 80, assemble these symbols into blocks, process these blocks through forward error recovery, and process the resolved data.

According to one construction, circulator 20 is a Saisum dual junction coaxial circulator, Part No. SS-HCC5628A available from Saisum, F/15, ITC Building, Southlake Road, Luohu District, Shenzhen, China. Optionally, other known constructions can be used.

In contrast, eSpin created its wave through antennas with polarization diversity driven by the same signal with phase delays produced through coax delay lines and received its wave back through the coax delay lines (de-spinning the signal). This caused the distinct signals to be merged together. However, problems still exist with implementation.

CTwists directly drives the antennas 12, 14, and 16 of antenna array 10 (see FIG. 1) with polarization diversity with its signal (giving a wider range of phase adjustment) and receives and processes the signals from each antenna without the loss of any information. Since CTwists waves are created using sinusoidal functions, they can be processed through fast fourier transforms (FFTs) in order to ascertain information about the CTwist waves, such as we identify the peak frequencies, we get the peak amplitudes, and we get the phase.

CTwists promises a more efficient use of presently available radio frequencies. The demand for the radio frequency spectrum is growing rapidly and CTwists can help meet that need.

The CTwists wave has been produced in experiments using crossed dipoles. The experiments generated and received the CTwists wave without data encoding. The experimental results have been reproduced in simulations which have refined the CTwists approach.

The CTwists wave creates two peaks in a frequency spectrum. The peaks are at the carrier frequency minus the twist frequency and the carrier frequency plus the twist frequency. Each peak was observed to be ultra-narrow-band. When the peaks are suppressed, the space between the peaks is shown to have no energy. The formulas used to create CTwists waves and Circular waves can be seen in FIG. 2:

Where: $f_c$—is the carrier frequency t—is the time

θ—is the carrier phase angle $f_t$—is the twist frequency

λ—is the twist phase angle

A. CTwists Simple Wave

Figure 3:
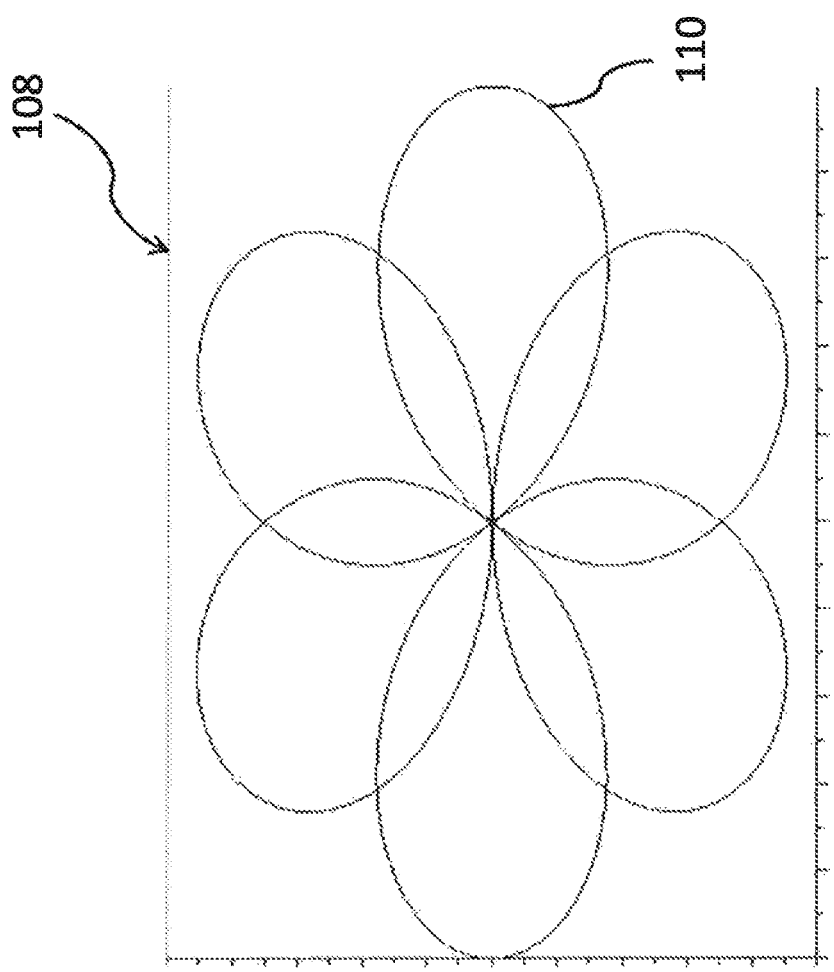
FIG. 3 is an end view of a three-dimensional digitally encoded radio frequency (CTwists) wave generated by a crossed dipole antenna.
Figure 4:
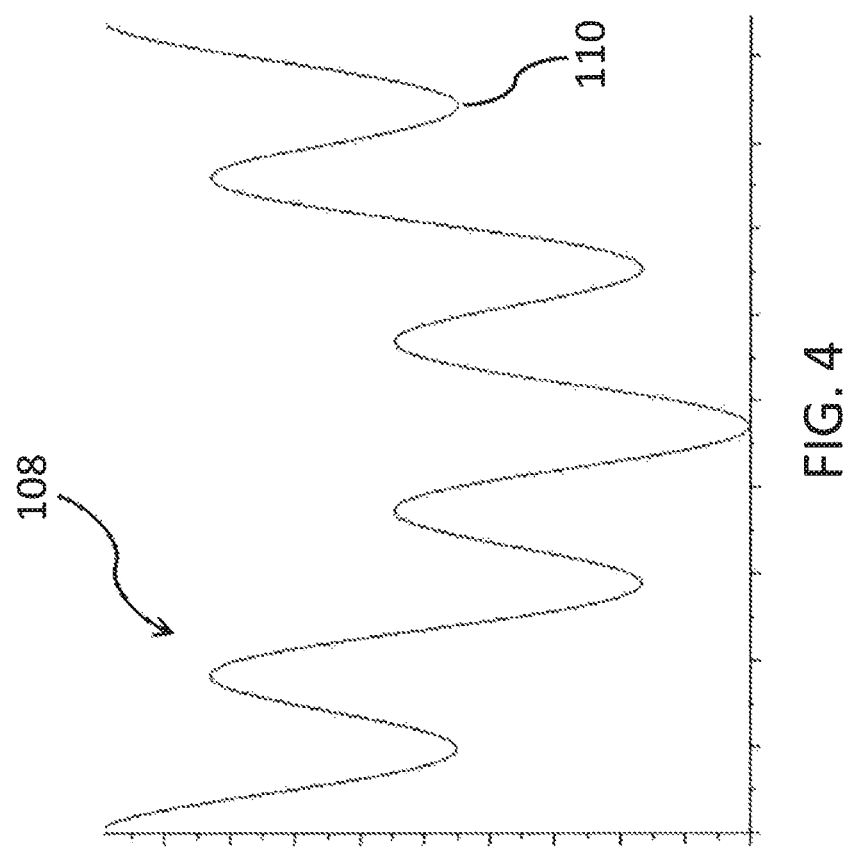
FIG. 4 is a side view of the CTwists wave.
Figure 5:
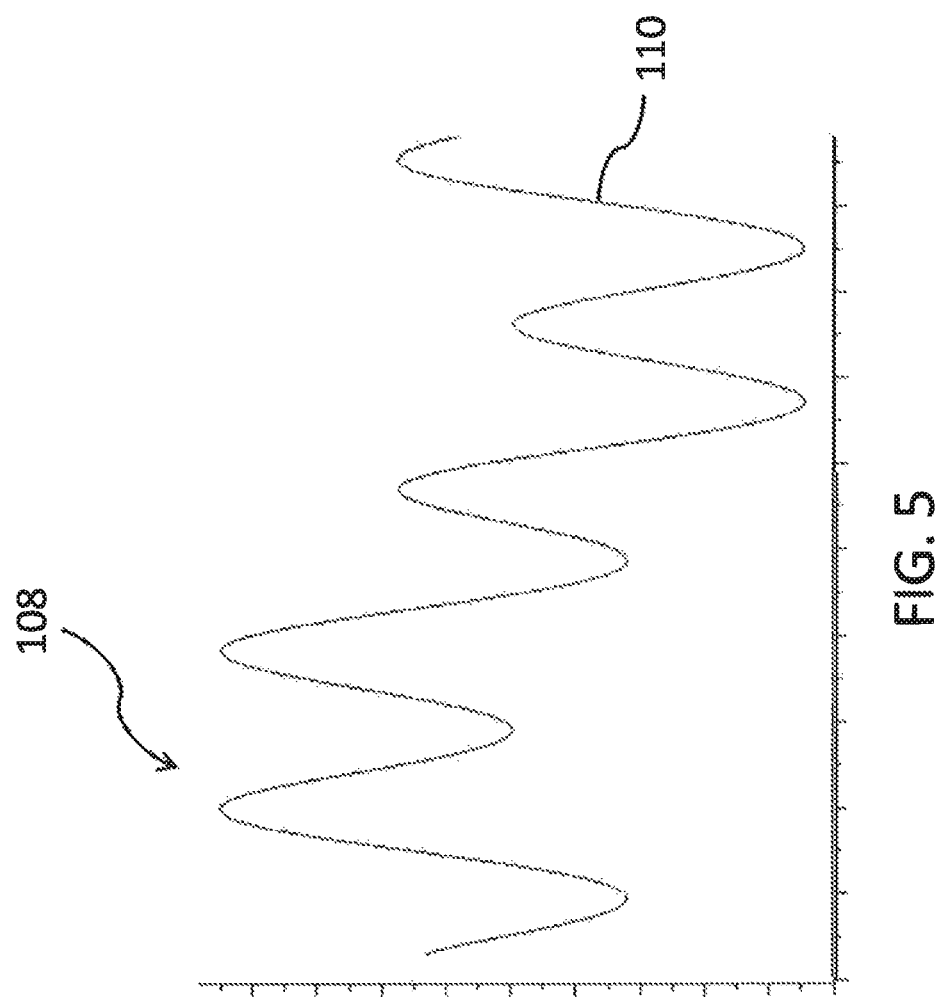
FIG. 5 is a top view of the CTwists wave.
Figure 6:
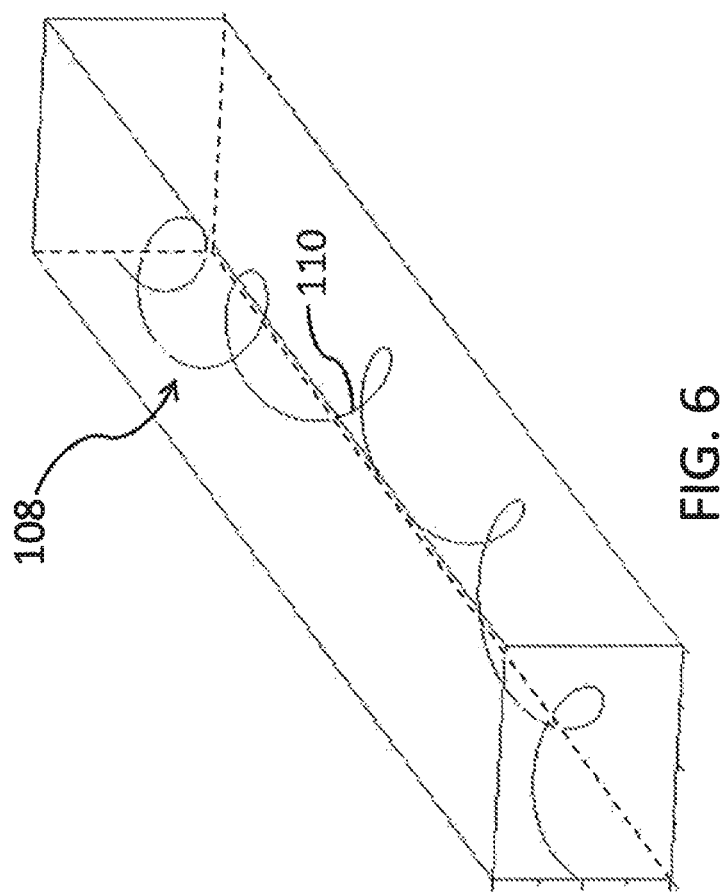
FIG. 6 is a three-dimensional front perspective view from above of the CTwists wave.

An end view of the CTwists wave can be seen in FIG. 3. The ratio of the carrier frequency to the twist frequency determines the number of lobes, or petals 110 in the flower-like-picture of the CTwists wave, taken in end view. The CTwists wave is depicted as a thread 108. The geometrically defined thread segment 110 of thread 108 represents the carrier that CTwists uses for data transmission. FIG. 4 shows the side view of the wave 108 with thread segment 110. Note: only enough of the wave is shown to define the pattern which is repeated. FIG. 5 shows a top view of the wave 108 and thread segment 110. FIG. 6 shows a 3D view of the wave 108 and thread segment 110.

Figure 7:
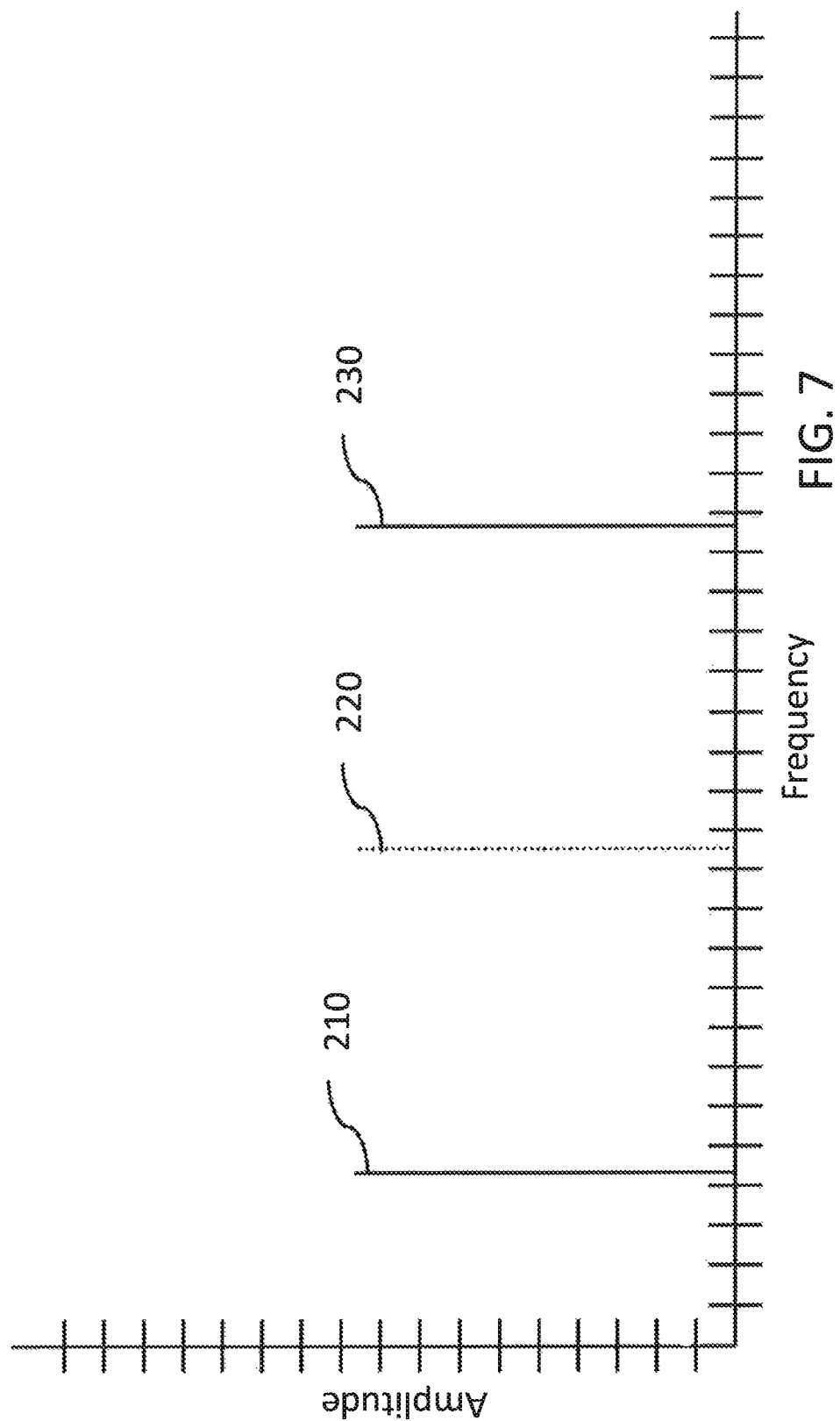
FIG. 7 is a sample Fast Fourier Transform (FFT) of the CTwists wave of FIGS. 3-6.

Each antenna is processed separately upon reception using a Fast Fourier Transform (FFT) algorithm which processes the samples from the time domain and creates a frequency domain view of the wave. A sample FFT can be seen in FIG. 7. Peak 210 shows the ultra-narrow band line created at the carrier frequency minus the twist frequency. Peak 220 shows where the carrier frequency would be seen had it not disappeared. Peak 230 shows the ultra-narrow band line created at the carrier frequency plus the twist frequency.

Figure 8:
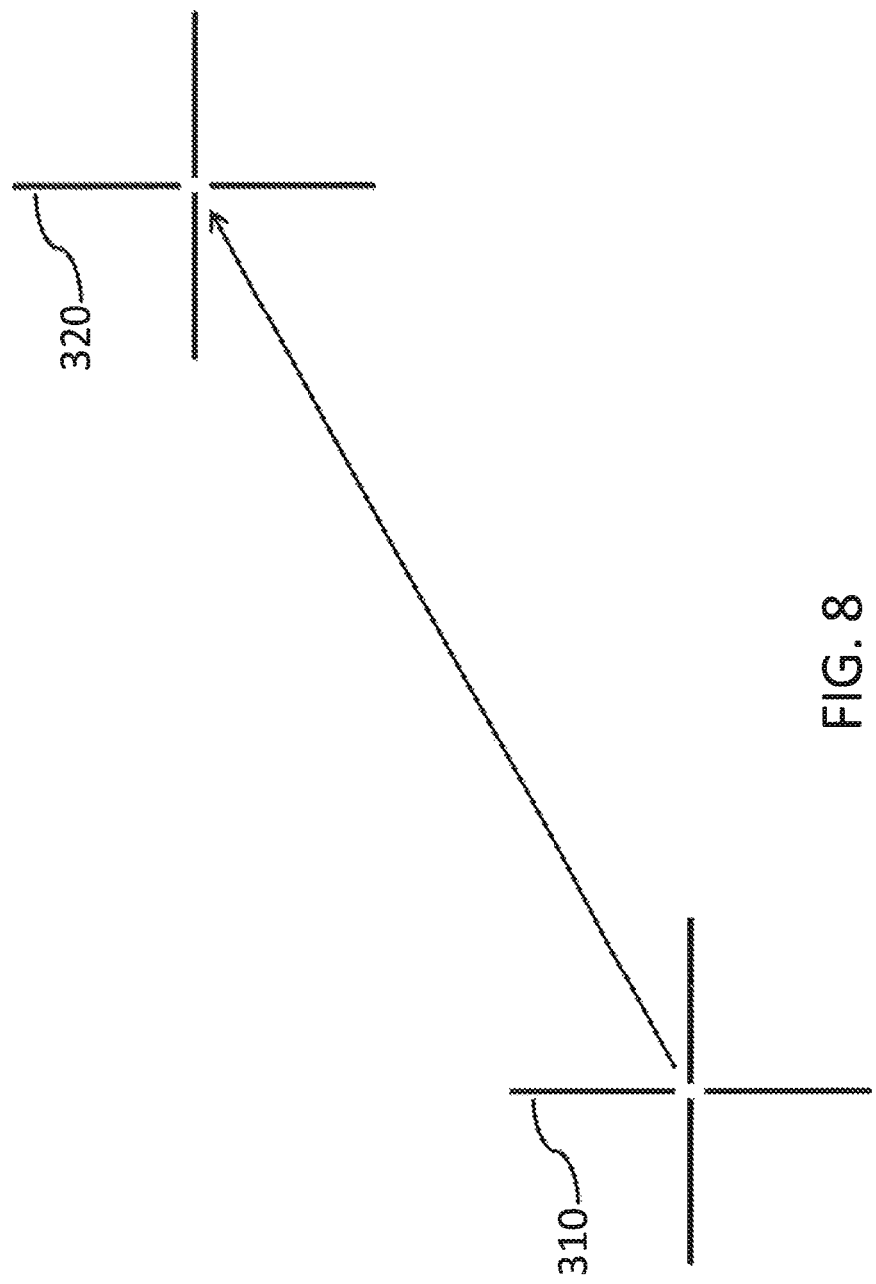
FIG. 8 is a representation of a cross dipole antenna system configured to generate and receive the CTwists wave of FIGS. 3-6.

The CTwists wave can be created using a crossed dipole antenna system as seen in FIG. 8. A transmitting antenna 310 and a receiving antenna 320 are shown spaced from one another in a wireless configuration for transmitting and receiving there between a digitally encoded CTwists wave, or thread(s). Note: this antenna system can be used to create circular polarized waves as well. In both instances, a right handed wave is created in one direction orthogonal to the transmitting antenna and a left handed wave is created orthogonal to the transmitting antenna in the opposite direction, superposed over the right hand wave.

For CTwists, two communication threads are created; namely, one right handed and one left handed. Half of the power is wasted unless a reflector is placed behind the transmit antenna to redirect the wasted power.

The CTwists wave has multiple unique characteristics. First, a reflected wave does not create a continuous null spot for reception. Secondly, waves penetrate obstacles more effectively than horizontal, vertical, or circularly polarized waves. Third, waves penetrate the ionosphere more effectively when ionosphere is disrupted by sun spots, coronal mass ejections, or scintillation than horizontal, vertical, or circularly polarized waves. Finally, the wave can, on reception, be recognized at two different frequencies on each of the antennas with polarization diversity. This provides redundancy and the ability to distinguish the CTwists wave from different types of interference.

According to this implementation, the two orthogonal antenna systems for CTwists produce the simple CTwists wave.

B. CTwists Complex Wave

Figure 9:
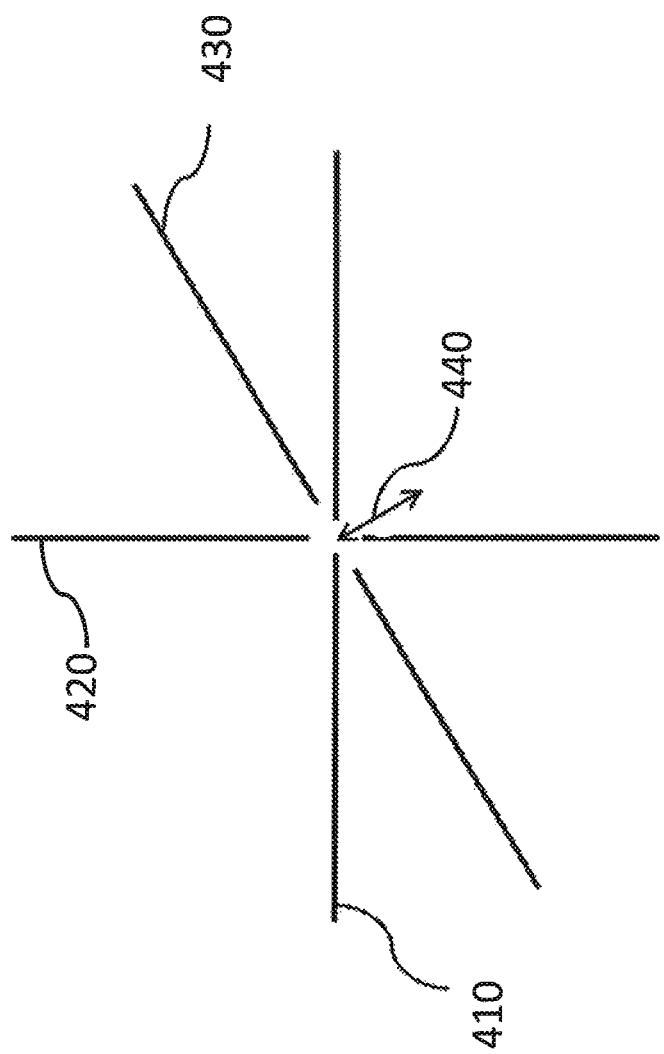
FIG. 9 is a view of a three crossed dipole antenna configured to transmit and receive the CTwists wave of FIGS. 10-13.
Figure 10:
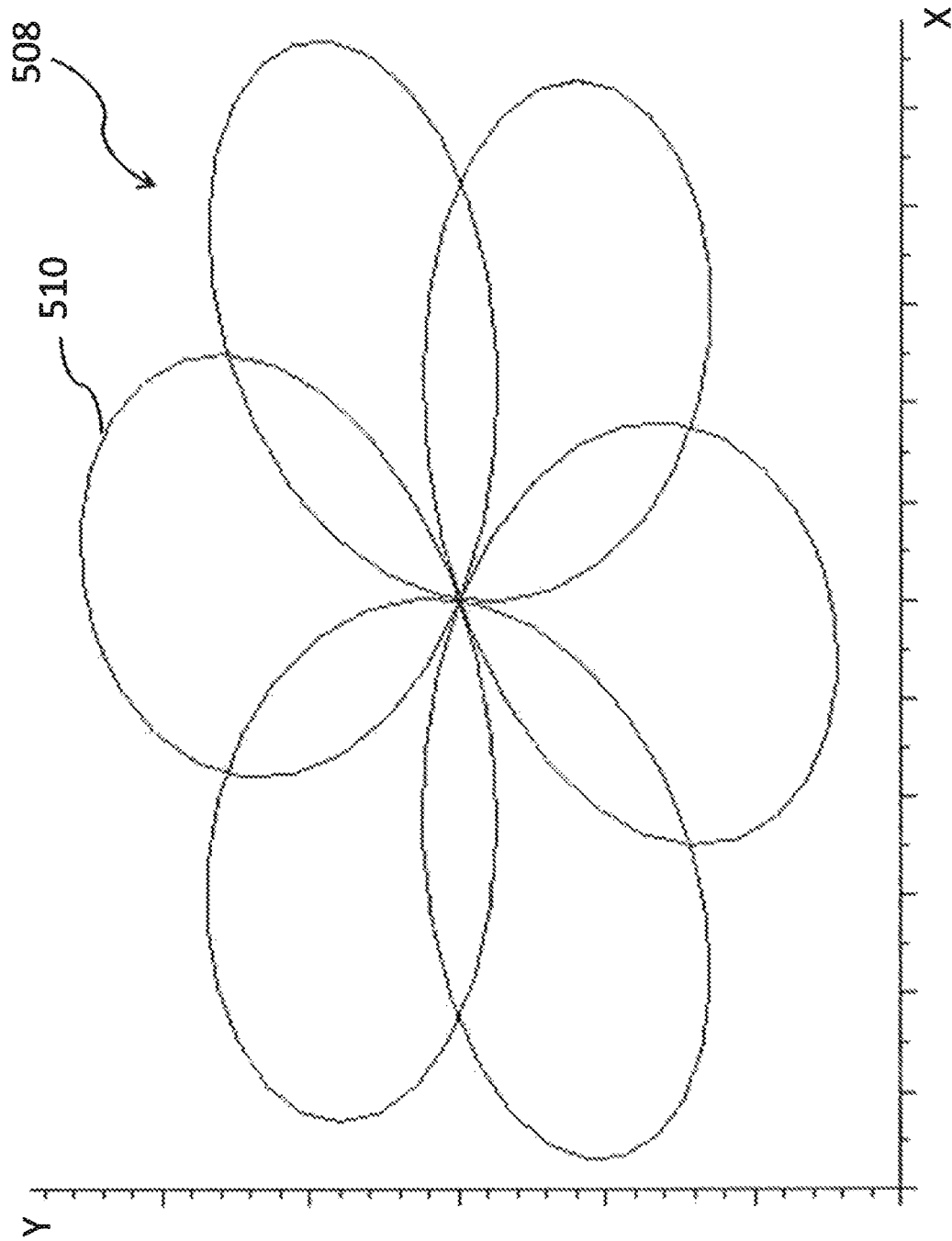
FIG. 10 is a front end view of the wave produced from 3 orthogonal antennas depicted in FIG. 9.
Figure 11:
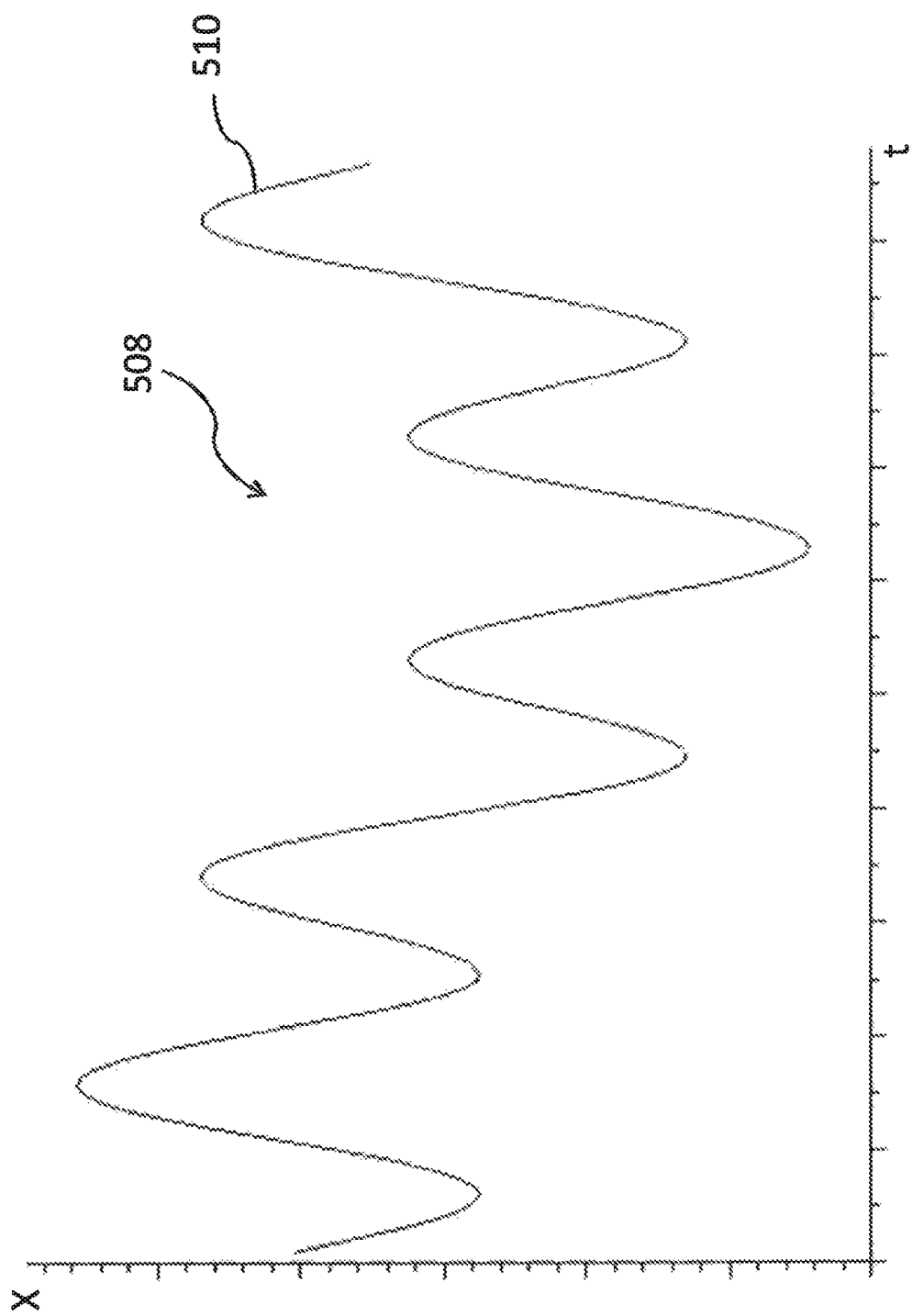
FIG. 11 is a side view of the wave produced from 3 orthogonal antennas.
Figure 12:
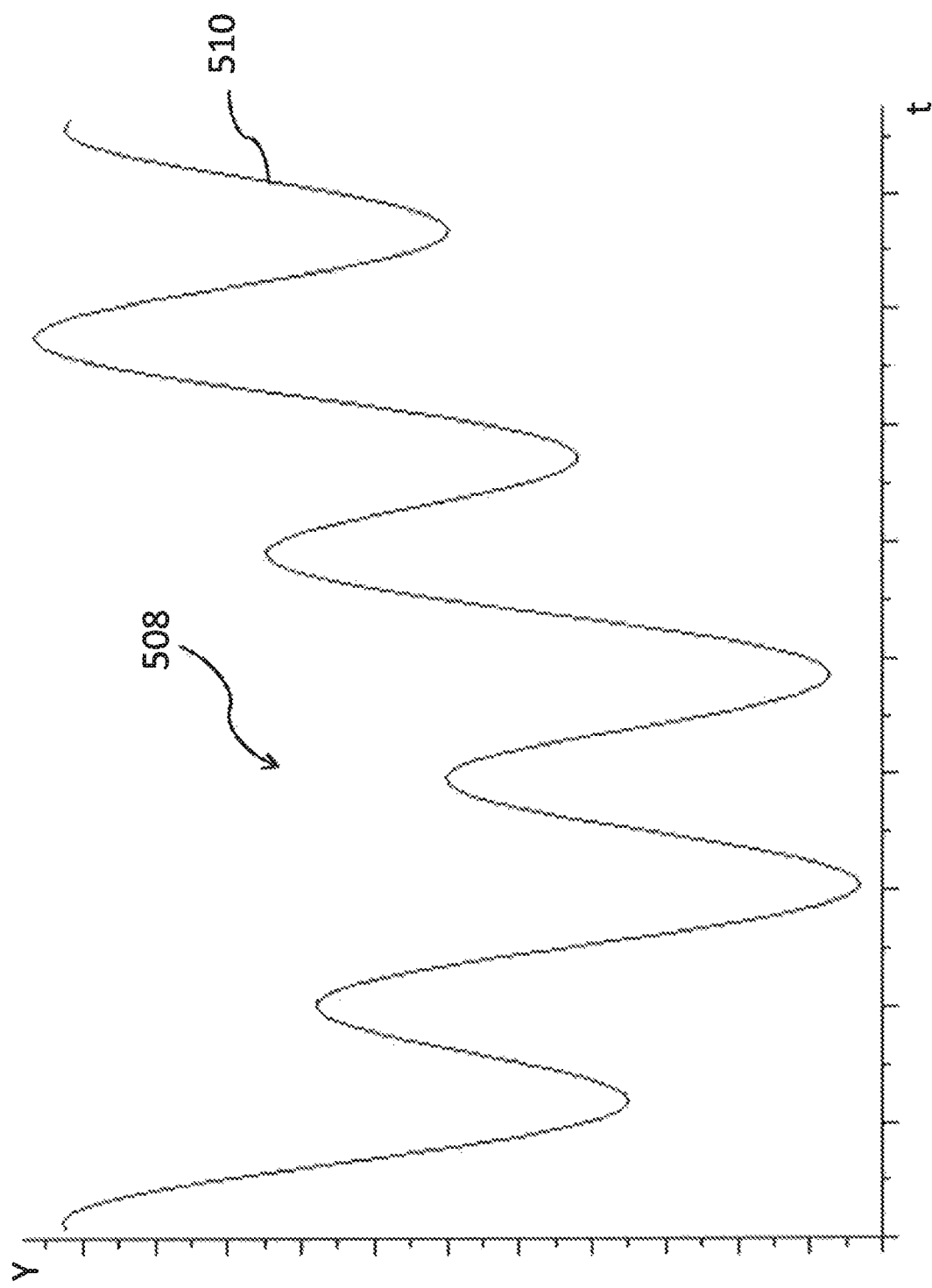
FIG. 12 is a top view of the wave produced from 3 orthogonal antennas.
Figure 13:
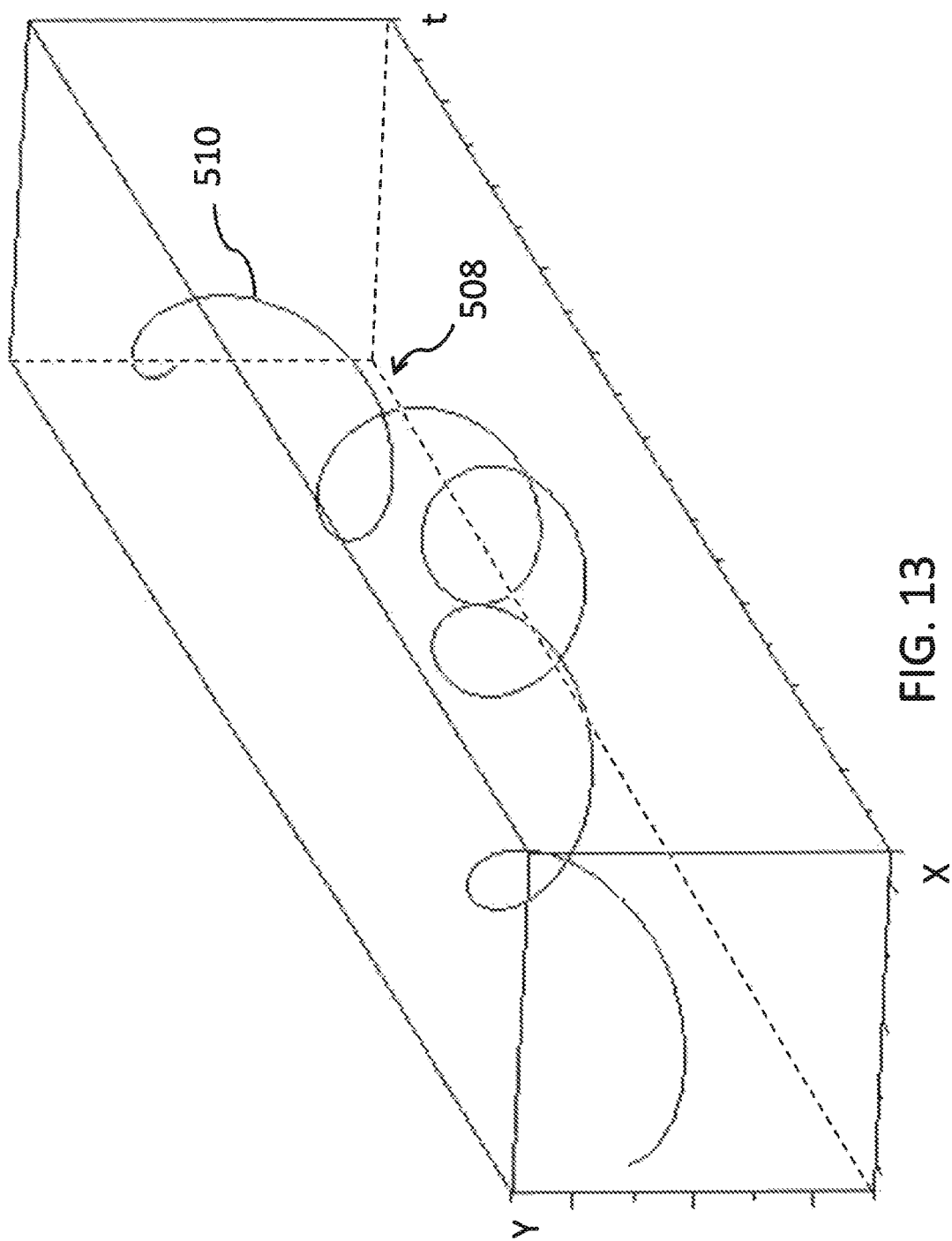
FIG. 13 is a three-dimensional front perspective view from above of the CTwists wave produced from 3 orthogonal antennas.
Figure 14:
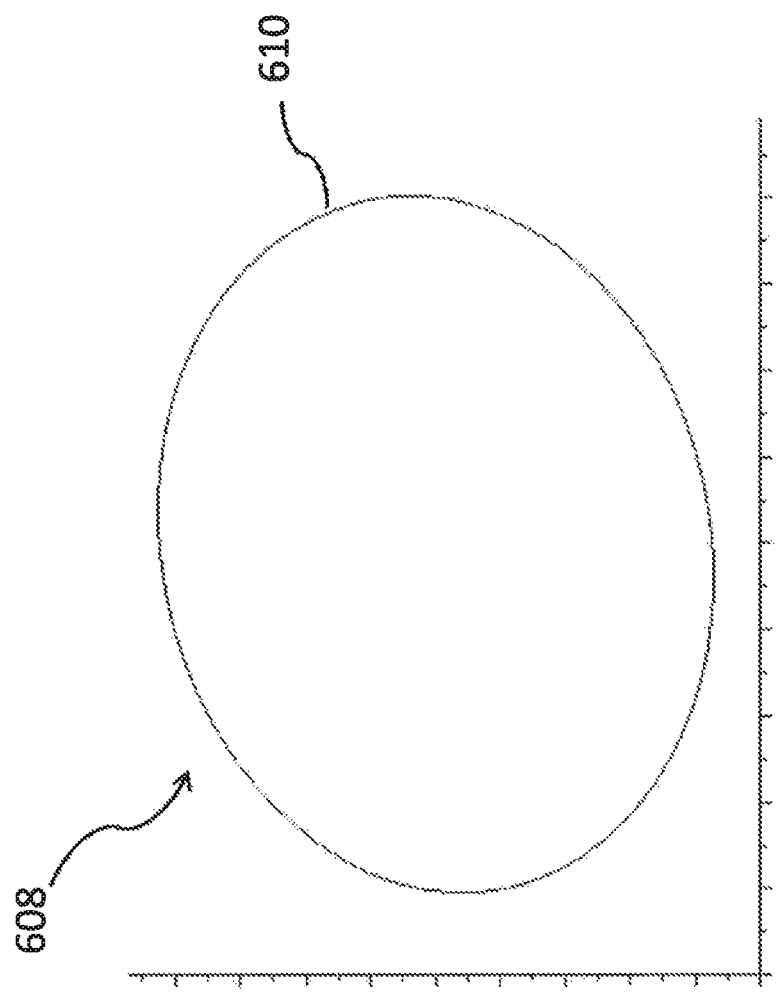
FIG. 14 is an end view of a Super Circular wave created using a 3 orthogonal antenna set.
Figure 15:
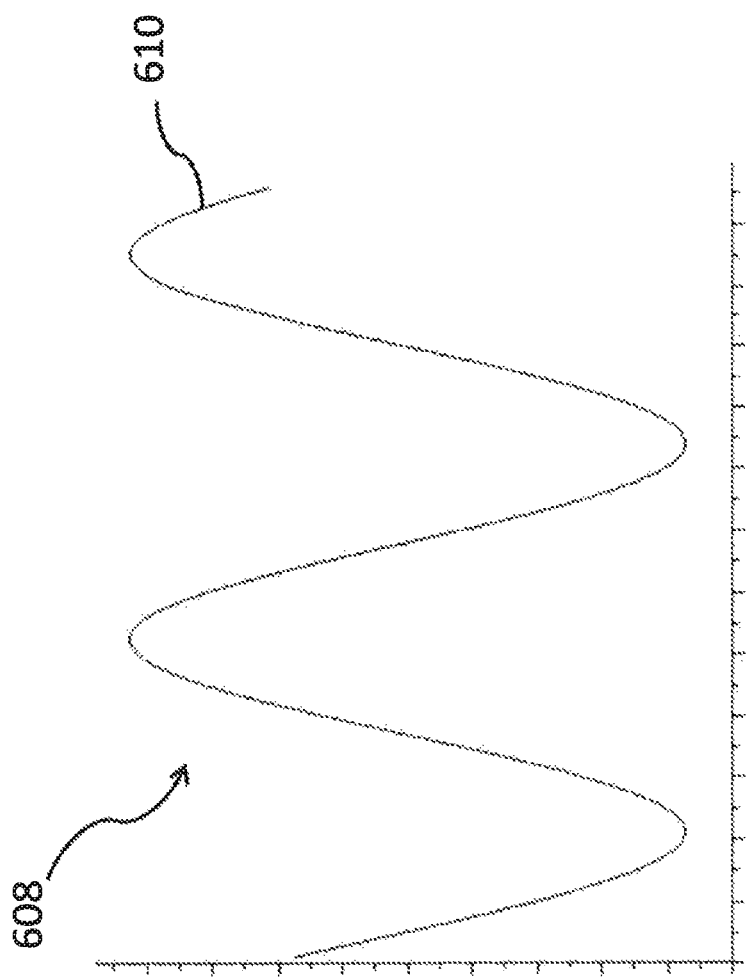
FIG. 15 is a front view of a Super Circular wave created using a 3 orthogonal antenna set.
Figure 16:
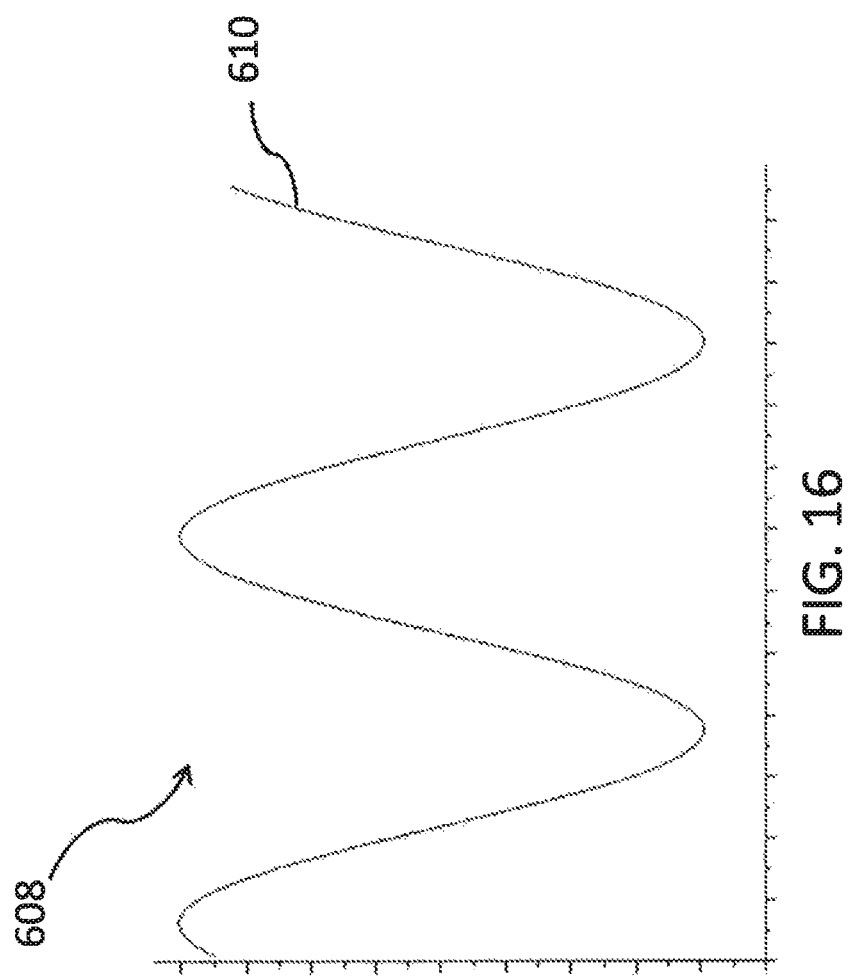
FIG. 16 is a top view of a Super Circular wave created using a 3 orthogonal antenna set.
Figure 17:
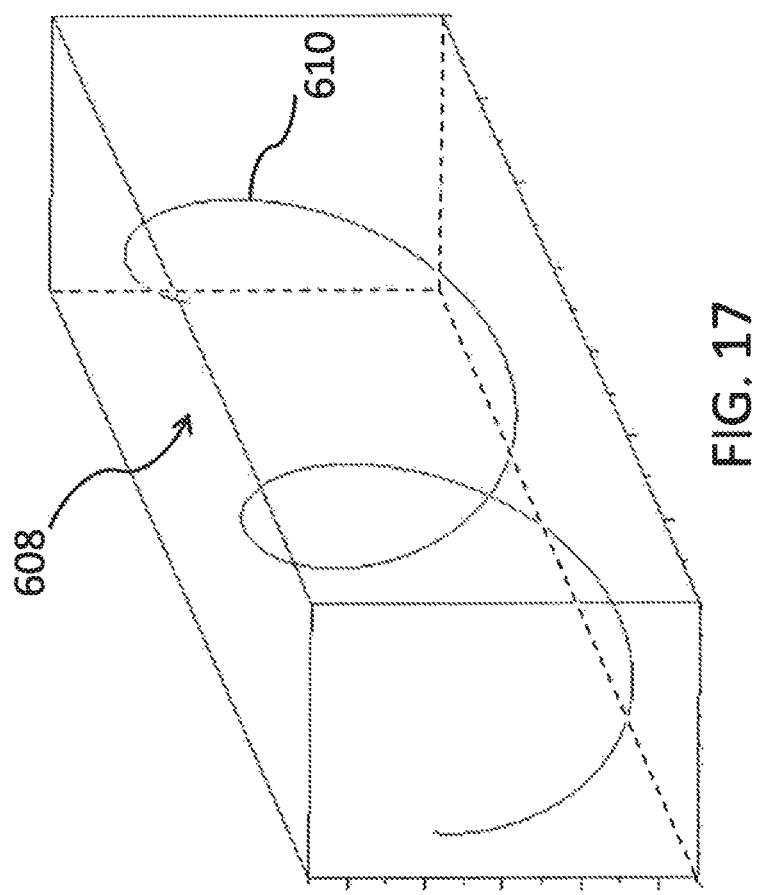
FIG. 17 is a 3D view of a Super Circular wave created using a 3 orthogonal antenna set.

More complex CTwists waves are produced using three orthogonal antennas. FIG. 9 shows the simplest of three different orthogonal antenna systems in the form of three crossed dipoles. Antenna 410 represents the X axis, antenna 420 represents the Y axis and antenna 430 represents the Z axis. As a result, antennas 410, 420, and 430 provide an orthogonal array of crossed dipole antennas, similar to antenna array 10 of FIG. 1. Note: the X, Y, and Z antennas transmit and receive along an axis (shown as axis 440) which is equidistant from each of the X, Y, and Z axes which is an angle of approximately 54.74° between the X, Y, and Z axis and represents a potential loss of approximately 42%. However, due to the nature of the wave extending along this new axis, it is projected to be less. FIG. 10 shows an end view of this wave, or thread 508 and a thread segment, or lobe 510 of the communication thread is identified. FIG. 11 shows the front view of the wave 508 and thread segment 510. FIG. 12 shows the top view of the wave 508 and thread segment 510. Finally, FIG. 13 shows the 3D view of the wave 508 and thread segment 510. Note: due to dimensional limitations, the activity in the direction of transmission and reception was processed as a projection.

Based on limited early testing, the 3D threads which communicate the CTwists data are believed to be much less interfering than traditional waves and much more penetrating through obstacles. The past 30 to 42 dB improvements of selectivity of signal out of noise were not expected by prior investigators. The present CTwists wave generation and reception via specific antenna arrays unexpectedly solved problems previously encountered and the antenna configuration provided significant advantage using the three orthogonal antennas rather than the prior eSpin three antennas separated by 120 degrees within a plane. Such realization of improvement would prove to be a surprise to those of ordinary skill in the art.

FIG. 14, FIG. 15, FIG. 16, and FIG. 17 are respectively end, front, top, and 3D perspective views of a Super Circular wave, or thread 608 produced by three orthogonal antennas in an antenna array.

There are two types of the three orthogonal antenna systems. First, there are omni-directional three orthogonal antenna systems. Second, there are directional three orthogonal antenna systems.

The three crossed dipole antenna system is the simplest of the omni-directional three orthogonal antenna systems. However, by using the three-dimensional edge of cell phones, tablets, or laptops for the Z component, these can also be included into the omni-directional three orthogonal antenna systems. Multiple communication threads of different types emanate in all directions from these antennas. Note: these antennas can also produce what is termed "Super Circular Polarized" waves, in that, depending upon the direction the communication threads, they are either circular or elliptical and either right-handed or left-handed based upon the contributions of each antenna in that particular direction.

Directional three orthogonal antenna systems include a horn and a parabolic directional three orthogonal antenna array. More particularly, FIGS. 18A and 18B illustrate an antenna array 710 including a horn 718 housing three orthogonal antennas 712, 714, and 716 which will produce multiple communication threads with the majority of the energy focused in a 60° wedge with an approximate 12 dB gain.

The three antenna complex antenna array 710 of FIGS. 18A and 18B contains three ¼ wave antennas 712, 714, and 716 each with ¼ wave circular radial bases 722, 724, and 726. Antennas 712, 714, and 716 point toward the opening of the horn, or horn antenna 718. Communication threads are created based upon the interactions of the three ¼ wave antennas 712, 714, and 716, and from the interactions of the three ¼ wave circular radial bases 722, 724, and 726. Optionally, the complex array 729 of three antennas 712, 714, and 716 (from FIG. 18A) when placed at the focal point of a parabolic reflector, such as parabolic reflector 728 of FIG. 18C, focused inward produces an optional parabolic three orthogonal antenna system over that depicted by antenna array 710 of FIGS. 18A and 18B. Both the ¼ wave antennas 712, 714, and 716 and ¼ wave circular radial bases 722, 724, and 726 are tuned so that their electrical length and size resonates in the middle of the target radio frequency spectrum and adjusted position wise to minimize return loss (i.e. a Standing Wave Ratio (SWR) of 1 to 1). The parabolic three orthogonal antenna system of antenna array 710 produces a narrow beam with a high gain in excess of 18 dB.

C. Control

Figure 19:
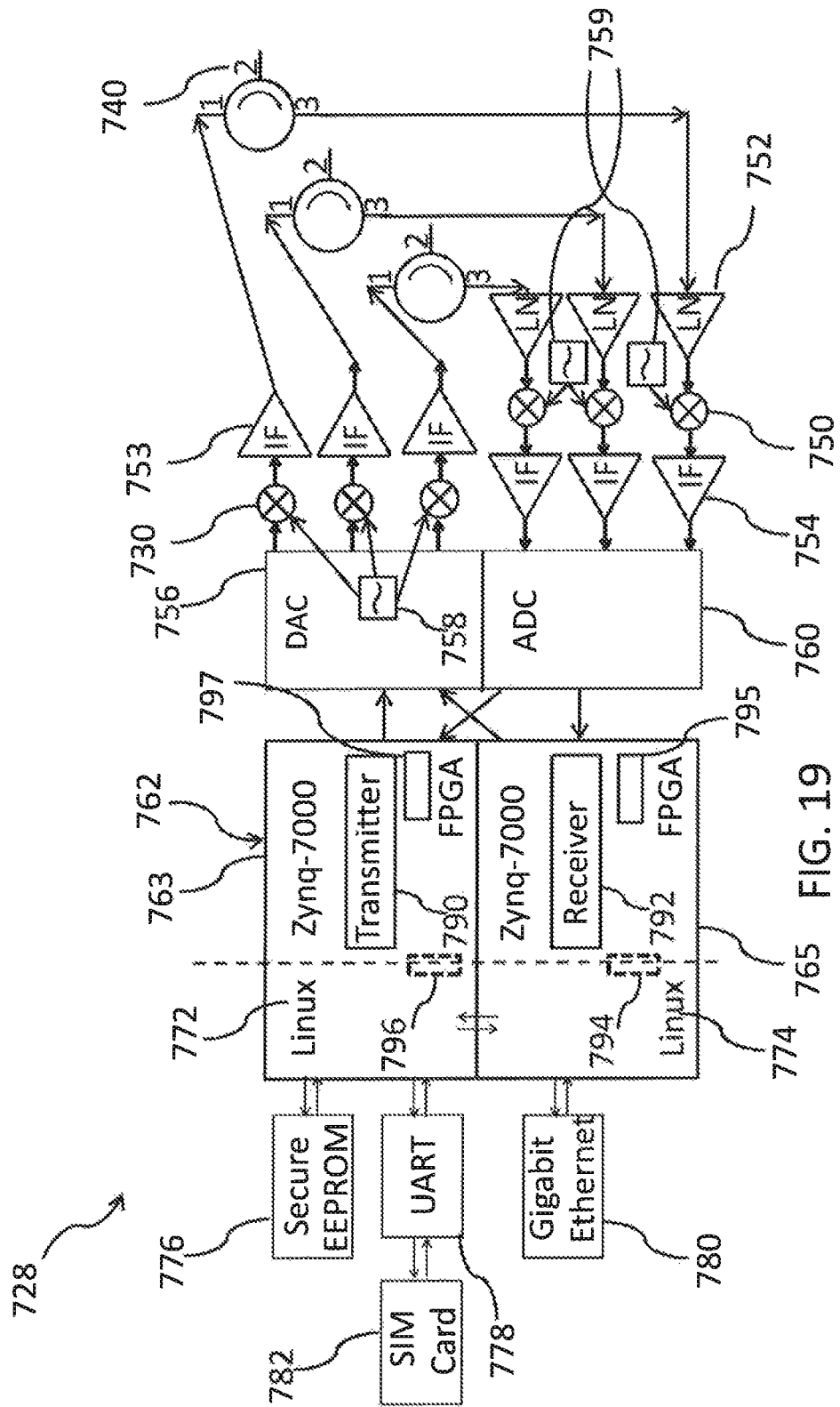
FIG. 19 is a schematic block diagram showing notional flow of data in a direct antenna control process for the antenna array depicted in FIGS. 18A and 18B.

A key to the CTwists processing is the direct control of the antennas rather than delay lines, as was the case in eSpin. FIG. 19 illustrates an example simplified flow of data in this direct antenna control process. An antenna transmitting and receiving process control system 728 is illustrated. A plurality of individual mixers 730 each implement an intermediate frequency (IF) process via individual intermediate frequency (IF) processors 753 that mixes a defined oscillator frequency to up convert the frequency to a desired range for each respective antenna. Likewise, a plurality of individual mixers 750 implement an intermediate frequency process via intermediate frequency (IF) processors 754 that mixes a defined oscillator frequency to down convert the received frequency to a desired range. The IF amplifiers and filters of IF processors 753 and 754 are important to this effort in both transmit for up convert and reception where down convert brings the frequency down to a range that can be processed.

Individual antennas (not shown) are attached to circulators 740 in FIG. 19. Note: the 2 position of each circular is attached directly through connectors and coax to an antenna (such as the antennas of FIGS. 18A-C). The circulators attach to low noise (LN) amplifiers 752, mixers 750, IF amplifiers and filters 754 for received signals (3 position), and to IF amplifiers and filters 753 from mixer 730 for transmit (1 position). The digital to analog converter (DAC) 756 feeds signals to mixers 730 and the analog to digital conversion (ADC) 760 receives signals from IF amplifiers and filters 754. Note: the frequency of the feed from the local oscillator 758 to the transmit mixers 730 may be different from the feed from the local oscillator 759 to the receive mixers 750. An alternative to the analog up-convert/down-convert approach shown in FIG. 19 is to employ a digital down-convert (DDC) and direct digital synthesizer (DDS) approach.

As shown in FIG. 19, system 728 also includes a secure EEPROM 776 that contains FPGA programming and a Linux operating system for initialization. EEPROM 776 is maintained with a current level of functional programming. EEPROM 776 is isolated in order to prevent corruption from any source. A SIM card 782 is configured to provide SIM function that saves unique data for the device of system 728 along with these configuration parameters; namely, server frequencies, uplink frequencies, and twist frequencies. For each client and server, the MAC addresses, encryption certificates, and the appropriate combinations of the configuration frequencies will be encoded upon the SIM card 782 SIM card 782 communicates bi-directionally through a universal asynchronous receiver/transmitter (UART) 778 with a development PC board 762 containing a pair of Field Programmable Gate Arrays (FPGAs) 763 and 765. Optionally, PC board 762 and FPGAs 763 and 765 can be implemented on an ASIC.

As shown in FIG. 19, each FPGA 763 and 765 includes a respective transmitter 790 and receiver 792, having transmitting and receiving circuitry. Each FPGA 763 and 765 includes a Xilinx Zynq-7000 all programmable system of a chip (SoC), as well as resident Linux operating systems 772 and 774. Additionally, each FPGA 763 and 765 includes respective processing circuitry 797 and 795, as well as memory 794 and 794.

A Gigabit Ethernet interface 780 shown in FIG. 19 allows for data to be received into or transmitted from the CTwists communication system. Accordingly, Gigabit Ethernet connection 780 is provided to PC board 762 for network connectivity with other devices and systems.

II. Ultra-Narrow Band Communication

CTwists ultra-narrow band communication promises a more efficient use of the available radio frequencies. Demand for the radio frequency spectrum is growing rapidly and CTwists ultra-narrow band communication can help meet that need.

The objective is to directly encode digital information onto an ultra-narrow band wave without producing side bands and becoming wide band. This should allow many more communication channels and reduce the power required to transmit a given amount of data. As with GFSK and GMSK, CTwists ultra-narrow band communication smoothes the transition between frequencies. CTwists ultra-narrow band communication uses very close frequencies—closer than GMSK. However, rather than introducing intermediate frequency steps, as does GFSK and GMSK, CTwists ultra-narrow band communication produces a transition in which the power is maintained at the same level as the signal changes from one frequency to another, reducing power at one frequency in conjunction with increasing power by the same amount in the other frequency. This is done over a transition period designed to not produce side bands.

A. The Wobble

Figure 20:
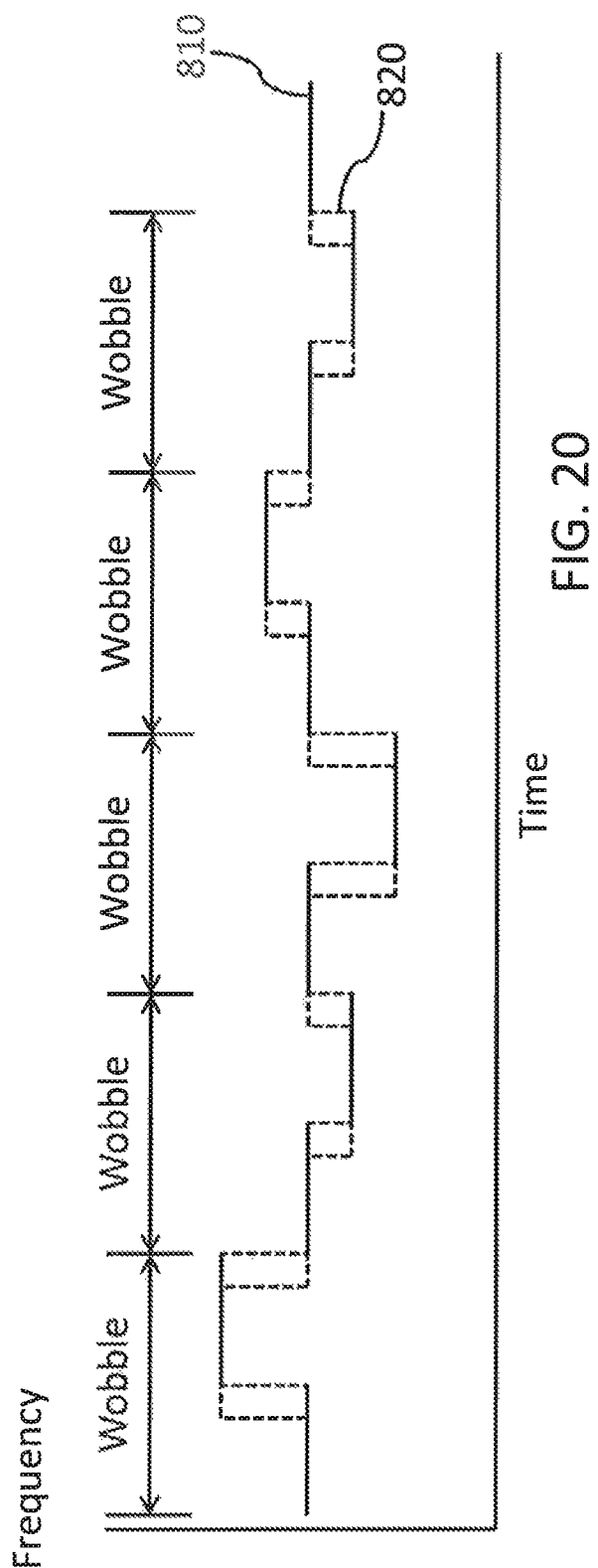
FIG. 20 is a representation of data communication through a Wobble.

Information is transmitted in symbols. The time to communicate a symbol is termed a "Wobble". The Wobble time is connected to a certain number of twists for CTwists communication threads or a number of carrier frequency cycles for horizontal, vertical, or circularly polarized communication. The Wobble is a tunable parameter. For purposes of the following examples, the number 32 twist for CTwists waves and 32 average cycles of the band segment for all other waves is used. However, this value can be tuned to maximize performance and minimize error rate. FIG. 20 shows a communication containing 5 Wobbles. A base reference frequency 810 is shown relative to a smooth transition period 820. Every Wobble starts at this frequency. The duration of the base frequency transmission is ½ the duration of the Wobble. At the end of the base frequency, a smooth transition period is used to avoid the production of side bands. The smooth transition period is shown as dashed rectangles. After the first smooth transition period in the Wobble, the data signal continues for ½ of the Wobble time. At the end of the data signal period, another smooth transaction period occurs to bring the frequency back to the base frequency as can be seen in section 820.

In this example, the data levels are determined by frequency increments above or below the base frequency. The frequency delta is a tunable parameter as is the number of levels. In this example, the 5 frequency levels encode data as follows:

TABLE 2

Level Value Assignment

| Level | Assigned Value |
|---|---|
| +2 | 3 |
| +1 | 2 |
| Base | null |
| −1 | 1 |
| −2 | 0 |

In this example, the amount of data encoding by frequency level is 2 bits per symbol. The base level also provides a reference point for the phase of the Wobble. The phase of the base defines zero. Using smooth transitions the phase of the data signal can be set to a specific value to encode more data per Wobble. Of the 360 degrees of possible values, from 16 to 64 possible target settings for phase would yield from 4 to 6 bits additional information per symbol. Again the phase angle targets, associated values, and the error tolerance are tunable values.

In this example, the total amount of data encoded in a Wobble or symbol ranges from 6 bits to 8 bits.

B. Smooth Transition

Key to the goal of not producing side bands and staying ultra-narrow band is the smooth transition. The amount of the Wobble dedicated to the two smooth transitions is also a tunable parameter. For this example, each smooth transition is assigned ¼ of the base or data signal. Within the smooth transition period, the time to start the transition is determined by considerations from the current and target phase. The transition starts at the phase beginning of the target phase. At that point, the power of the current frequency is lowered in conjunction with the increase of the power from zero of the target frequency.

Figure 21:
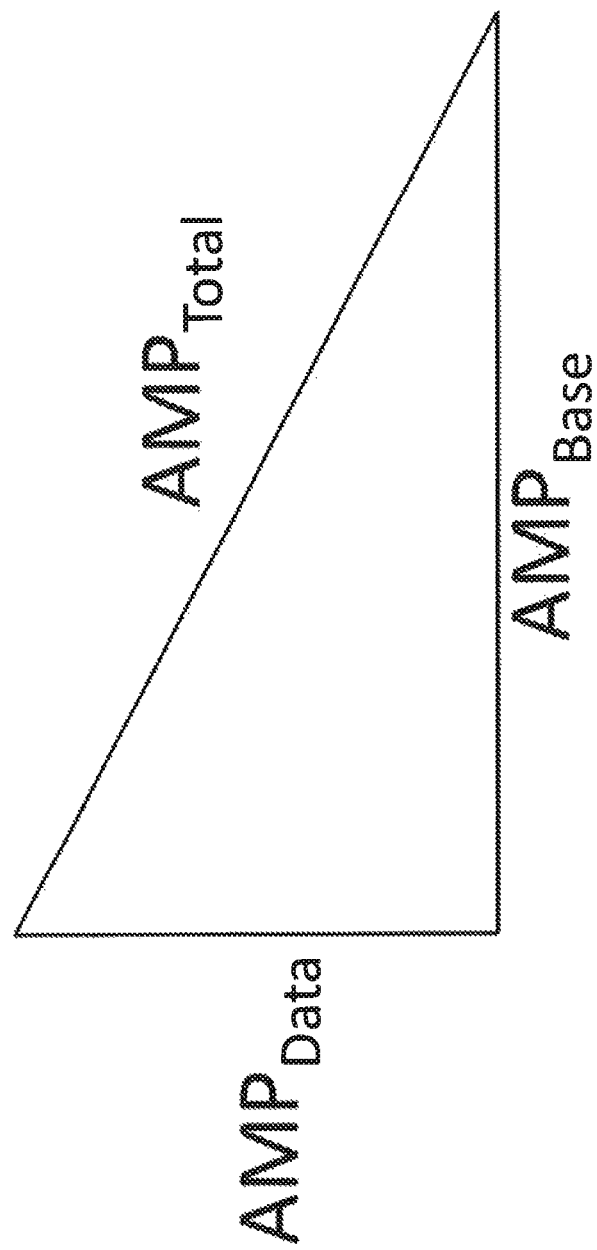
FIG. 21 is a right triangle showing amplitude relationships for smooth transitions.

The total power on the two frequencies can be calculated based upon the square root of the sum of the squares of the E-field strength for the two frequencies. This relationship can be seen in FIG. 21. As with the right triangle where the hypotenuse stays the same length as the lengths of the two sides vary.

C. FFT Results

Figure 22:
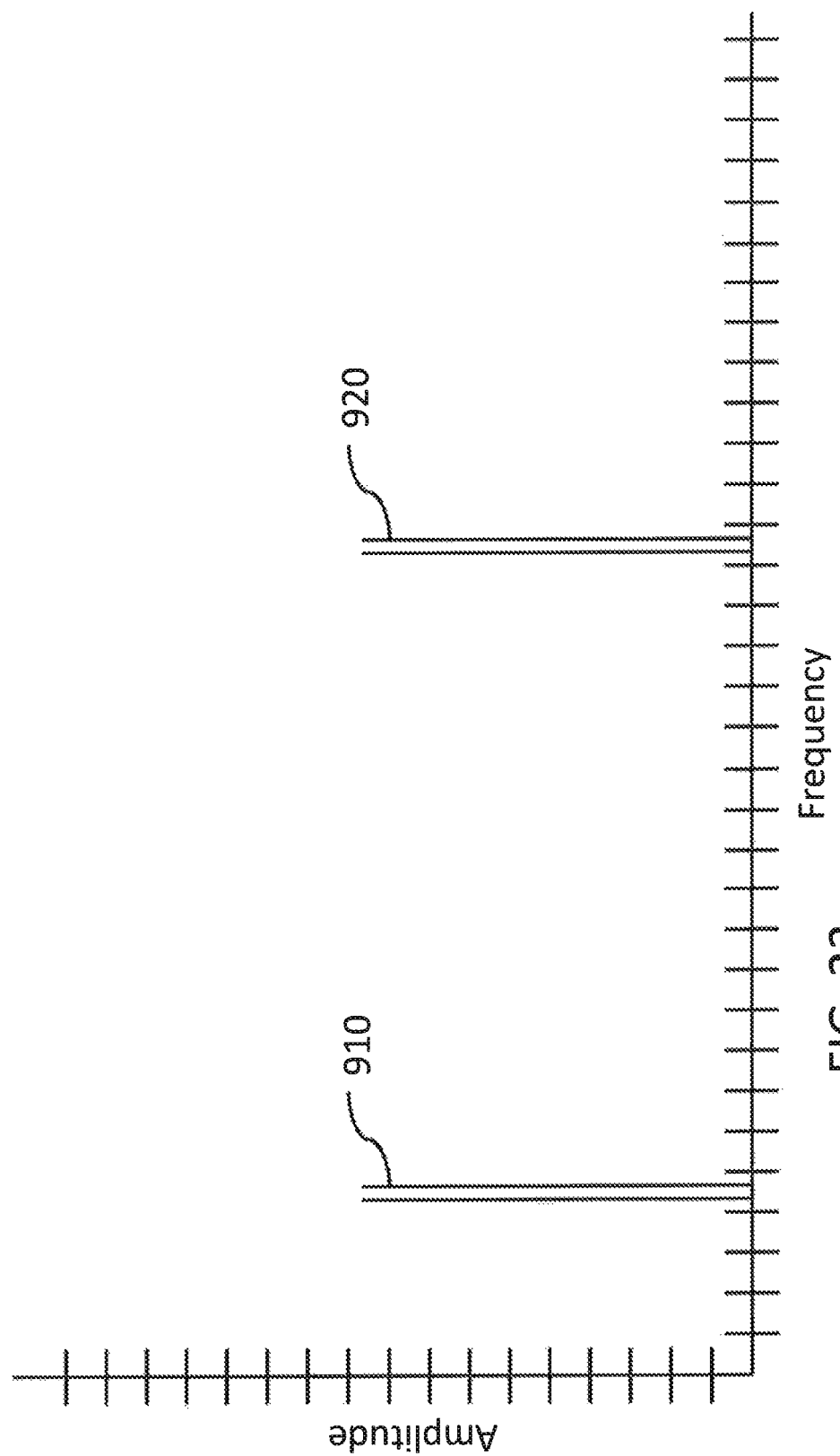
FIG. 22 is the FFT of a Wobble.

Each Wobble on reception is processed using a Fast Fourier Transform (FFT). FIG. 22 shows the typical result for a CTwists simple or complex wave. Note: for other waves, only the peaks in section 910 are seen. The peaks in section 920 are unique to CTwists waves. In every FFT, the line for the base should appear. The other line determines the data line value. The distance from the base line and direction indicates the first 2 bits of the data value. By processing the associated real and imaginary values with each line with the arc tangent function, the phase of the wave represented by the line can be determined. By treating the phase of the base line as phase zero and then evaluating the phase of the second line, the value encoded in the phase of the data line can be evaluated—the additional 4 to 6 bits. With the CTwists wave, the second set of peaks provides a redundant check. Each additional antenna should provide checks of the data value.

Errors can be detected when phase angles are out of range which may be corrected if other peaks offer better results. When different sets of peaks offer different results, an error is reported if the vote of the peak sets is a tie. Otherwise the majority wins.

III. Special FFT Processing

The Fast Fourier Transform (FFT) algorithm is controlled by several parameters:

n—the power of 2 that determines FFT Size (in this case 16)
FFTsize—The size of the FFT and the optimal number of samples (in this case 65,536)
NBins—The number of bins=FFTsize/2 (in this case 32,768), Each bin contains two floating point numbers—real & complex.
SR—The sample frequency
Fmax—The maximum frequency tracked by the FFT=SR/2
FR—The Frequency Resolution=Fmax/NBins The trade-offs of the FFT algorithm are as follows. First, the sample frequency (SR) determines the amount of time needed to collect the samples. The time for samples=SR*FFTsize which for a SR of 67/108,864 the time required is 0.00195313 seconds. Secondly, the frequency resolution (FR) is dependent on the sample frequency (SR) such that the higher the sample frequency—the lower the frequency resolution. In this case, the FR=1,024.

The nature of the Wobble, in its periodicity, allows clean periodic sampling where either every other Wobble can be sampled for twice the time to determine timing for the receive window or, once the timing of the Wobble is determined, the Wobble sample can be repeated the 256 times to complete the optimal number of samples for the algorithm. Padding with zeros causes loss of frequency resolution, but properly knitting together the periodic Wobble samples will maintain the frequency resolution of the bins.

A. Wobble Skew Determination

Figure 23:
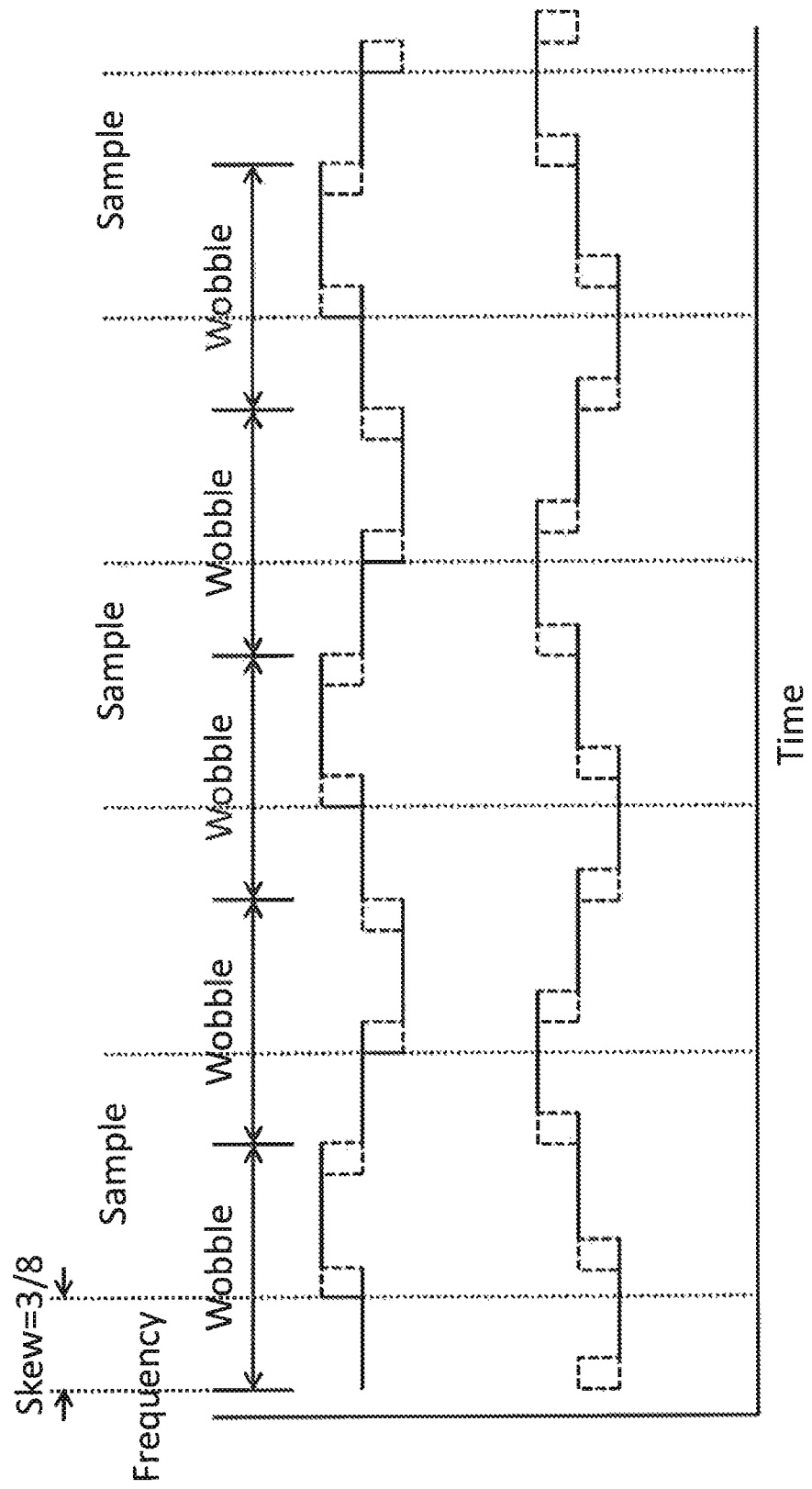
FIG. 23 is example of reception of Wobble broadcast out of phase.
Figure 24:
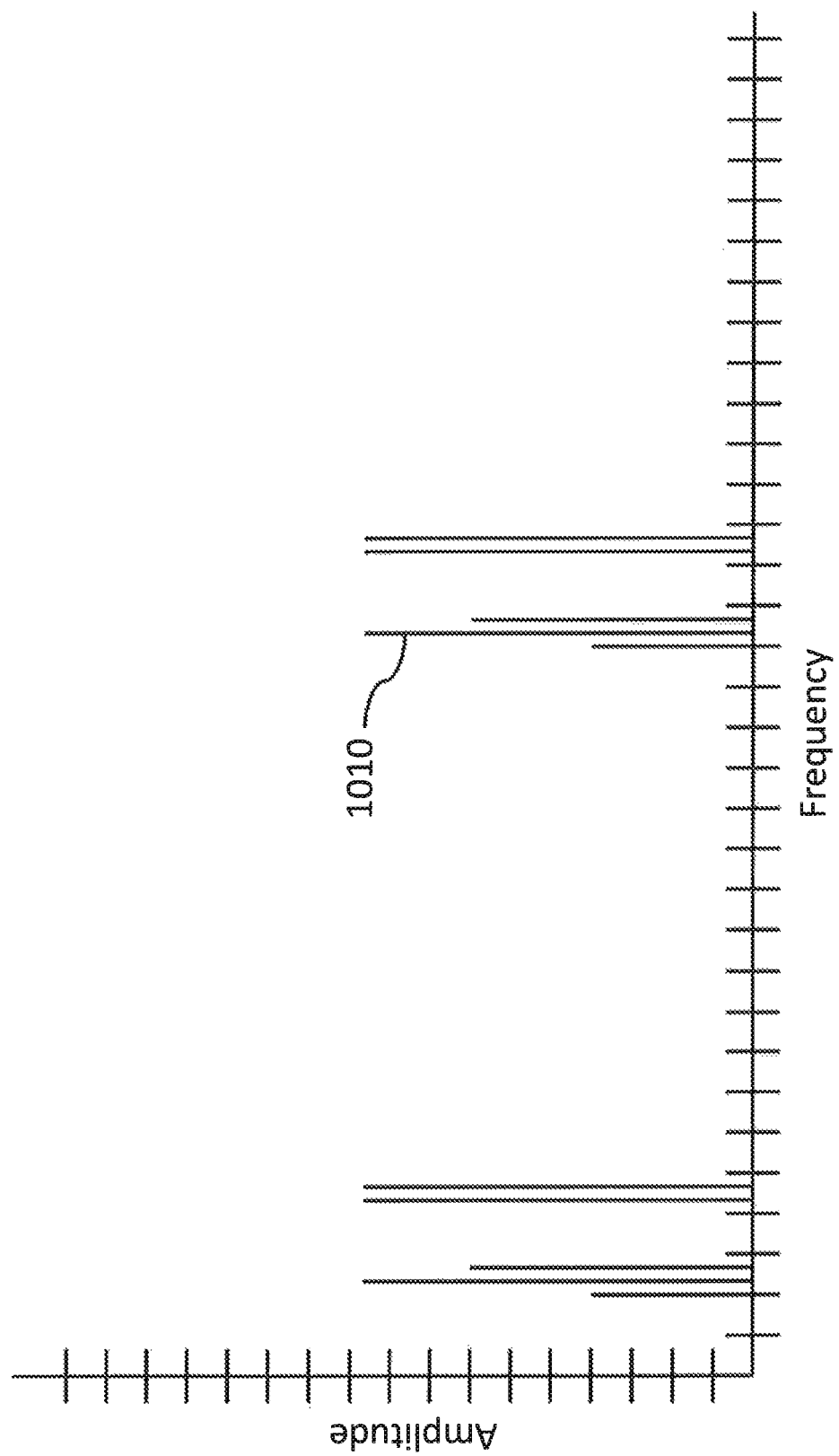
FIG. 24 is an example of FFT of Wobble broadcast out of phase.

The server will transmit two periodic signals with the second ⅝ths of a Wobble out of phase from the first ⅝ths of a wobble. In FIG. 23, every other Wobble is sampled and the resulting FFT can be processed to determine the skew of the time of the Wobble sample as compared with the true begin of the Wobble. FIG. 24 shows a FFT of the results of the out of phase every other Wobble sample. Peaks 1010 show the lower broadcast frequency that has three peaks which can be used to calculate the Skew (how far out of phase) the sampling windows are from the actual Wobble start.

Figure 25:
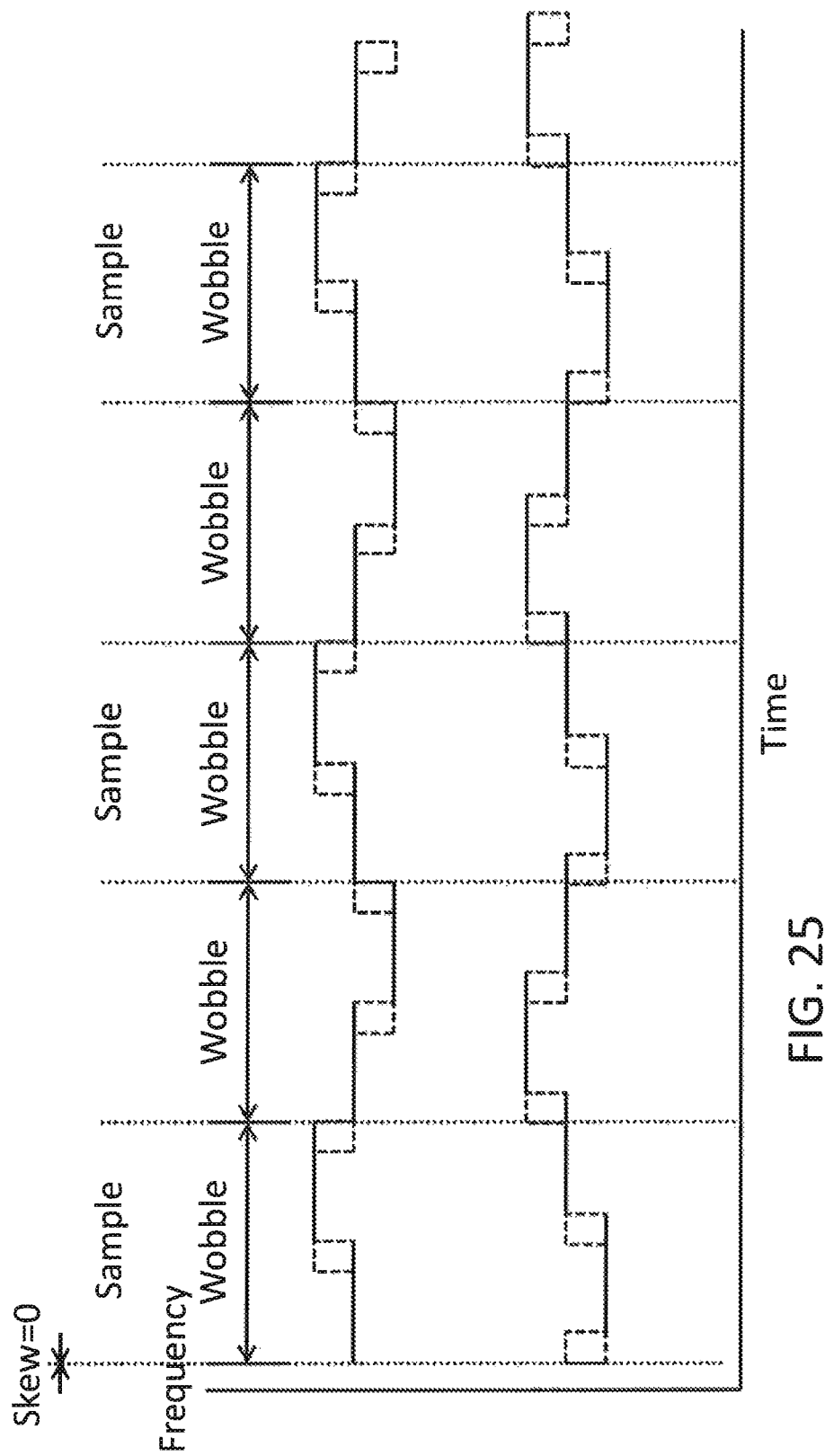
FIG. 25 is example of reception of Wobble broadcast in phase.
Figure 26:
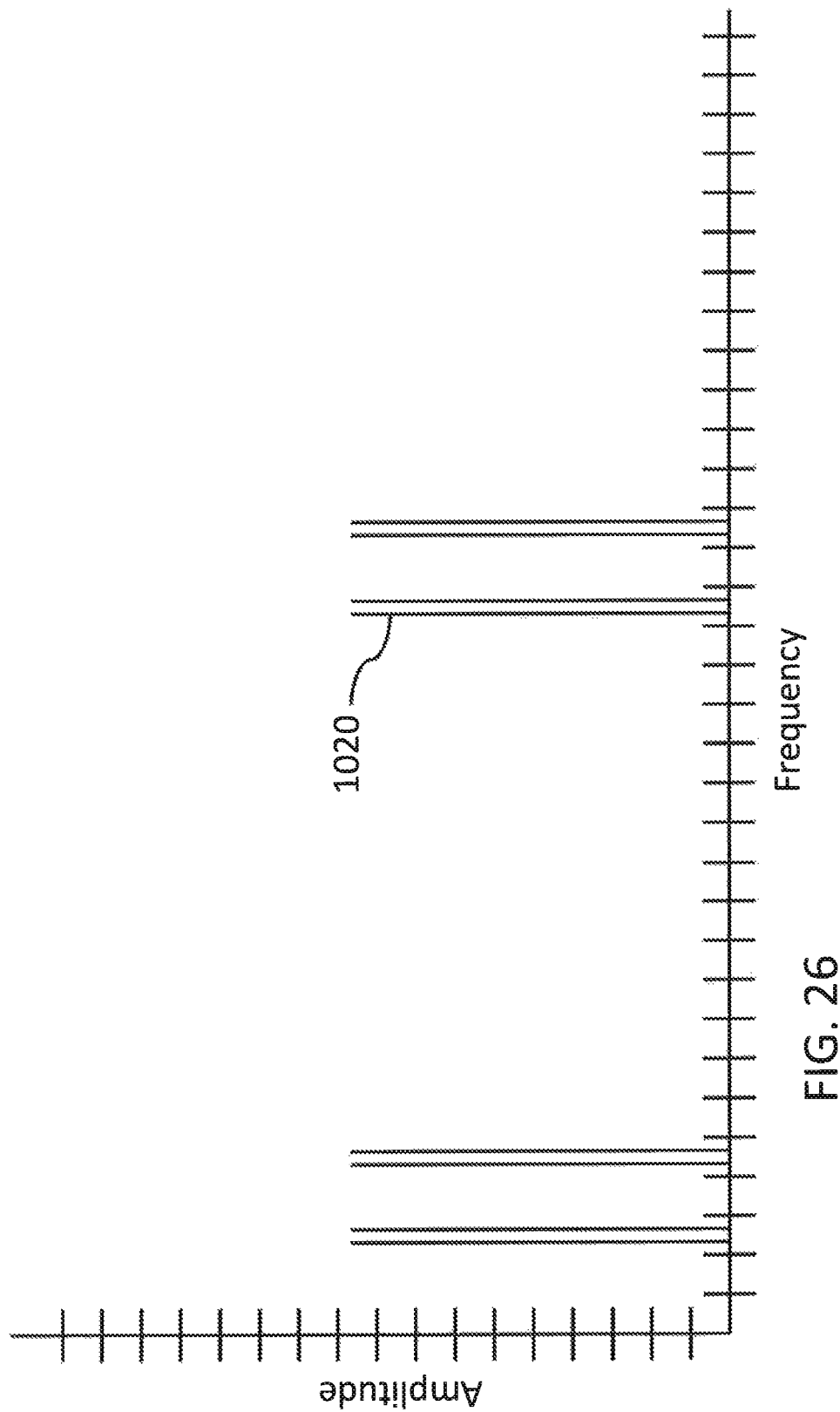
FIG. 26 is an example of FFT of Wobble broadcast in phase.

FIG. 25 shows an adjusted sampling time start that shows a Skew of 0. In FIG. 26, both of the broadcasts have only two lines in their peaks. Peaks 1020 are now only two peaks for the lower broadcast while the upper broadcast frequency stays at only two peaks.

B. Wobble Decoding

Note: a Skew of 0 to ⅜ths of a wobble produces good results for Wobble sampling. Once the sampling start time window is adjusted so that the Skew is within the range of 0 to ⅜, the Wobbles can be sampled within the window and repeated 256 times and fed to the FFT algorithm to determine the Symbol in the Wobble. A queue of Wobble FFT decoding will be created. Enough FFT resources need to be available to keep up with the Wobble decoding.

IV. Communication Management

CTwists Communication Management promises a more efficient use of the available radio frequencies. The demand for the radio frequency spectrum is growing rapidly and CTwists Communication Management can help meet that need with networks that provide consistent reliable secure service. CTwists Communication Management provides for the proper usage of these new resources.

Figure 27:
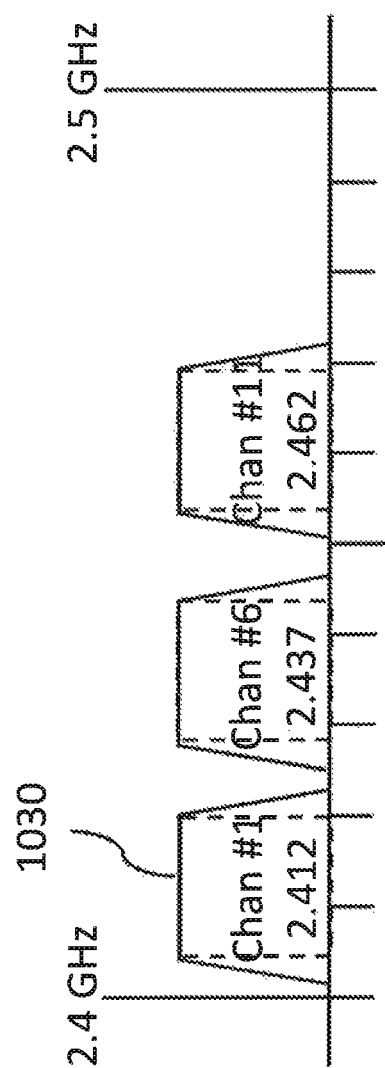
FIG. 27 is a picture of the 802.11n 2.4 GHz spectrum.

The initial target implementation for CTwists is to demonstrate its capabilities in the 2.4 GHz band. FIG. 27 shows the non-overlapping channels in that Wi-Fi band. Channel 1030 shows channel 1 in that band. It is a 22 MHz channel that will support 54 Megabits per second of data rate. Its range is about 35 meters.

Because CTwists up converts the signals produced with its FPGAs and DACs, the actual target frequency is adjustable. In this example, on transmit, the frequencies produced by the FPGAs and DACs are in the range of 2 to 26 MHz. These are then up converted to the 2.4 GHz range while maintaining phase.

On reception, the 2.4 GHz range frequencies are down converted to the 2 to 26 MHz range and then processed through the ADCs and FPGAs while maintaining phase. On reception, the Wobbles are processed separately, which means the number of samples are less than the target number, but the FFT result will be extrapolated by repeating the Wobble 256 times.

The initial implementation of the system will be based upon FPGA which have sampling rate limitations and FFT hardware constraints. Sampling rates should be under 130 MHz and the "n" for the FFT should be 16 or less. There are many options, but FIG. 28 illustrates two of them; namely, options 1 through 3 for CTwists and Super Circular.

Three nested options can be used for the CTwists wave. In option 1 between the high peaks and the low peaks, there is sufficient room to fit option 2 and between the high and low peaks of option 2 there is room for option 3. This is done by adjusting the local oscillator to up convert and down convert the options to different frequency ranges. Note: these options fit into approximately the same frequency space as one 802.11 channel that can carry 54 Mbps. This relates to 51 times more aggregated channels with same data capability, 53 times as much data capability, and with a 17 dB gain which means it requires 50 times less power for the same distance.

Figure 29:
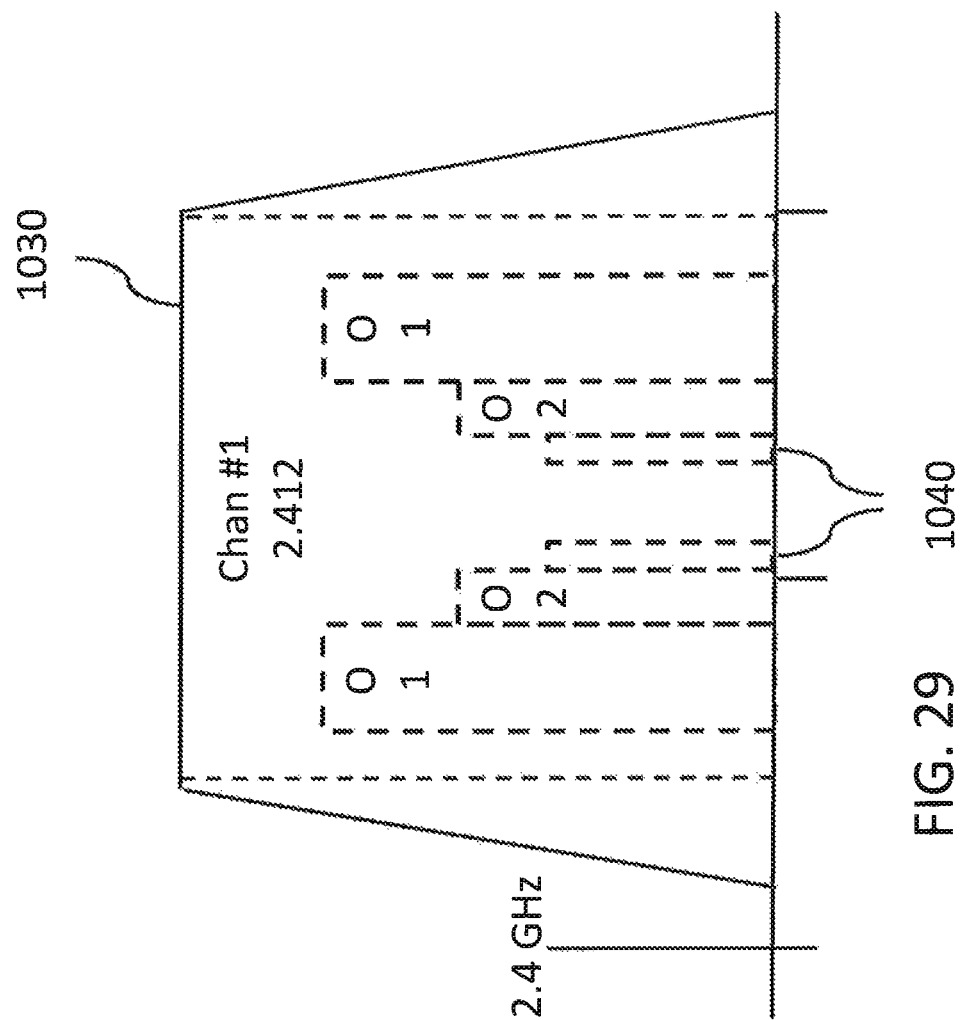
FIG. 29 is a picture of the CTwists 802.11n 2.4 GHz spectrum.

The option 1 channels could be used for server to client communication; the option 2 channels could be used for client to server communication; and the option 3 channels could be used to request service from server and clients with very low data uplink requirements. CTwists' options 1 through 3 can be seen in FIG. 29 where channels 1040 point to the option 3 area and options 1 and 2 are indicated by O1 and O2.

The Super Circular option has half the redundancy and may interfere more with legacy waves, but, as compared with 802.11n channel 1, it has 180 times the number of channels aggregated to the same data rate, 193 times as much data capability, and with a 23 dB gain which means it requires 200 times less power for the same distance.

In practice, the Super Circular data range would be split with one range for server to client communication and one range for client to server communication. Note: for Super Circular communication, the Twist frequency is the average frequency of the range.

CTwists wave will be evaluated against the Super Circular wave. There are two major factors; namely, dB gain of each wave, and legacy wave interference.

A. Server Channel Management

In either the CTwists wave or the Super Circular wave environment, many more channels are available to manage. The channels are smaller and if the upload or download requirement of the client is not met by one channel, then they can be aggregated to provide sufficient capability. The approach to managing this vastly increased number of channels should be rethought in order to take full advantage of the opportunity to improve both frequency spectrum utilization and client service level.

B. Spectrum Management

The server is in a unique position to handle multiple tasks. First, the server can monitor noise levels experienced in each channel. Second, the server can monitor error rates in each channel. Third, the server can monitor client data requirements. Fourth, the server can allocate low noise and low error rate channels first. Finally, the server can dynamically adjust data channel aggregation and redundancy to meet client needs.

C. Noise Level Management

The server can monitor the spectrum connected with its channels and track periodic interference and random interference in the channels. This is an ongoing activity and provides the current and historical data needed to make optimal channel allocation decisions based upon noise level history and level.

D. Error Rate Management

The server can track channel error rates for data server bound and clients should report their error experience for channels on which they receive data from the server.

E. Error Recovery

Figure 30:
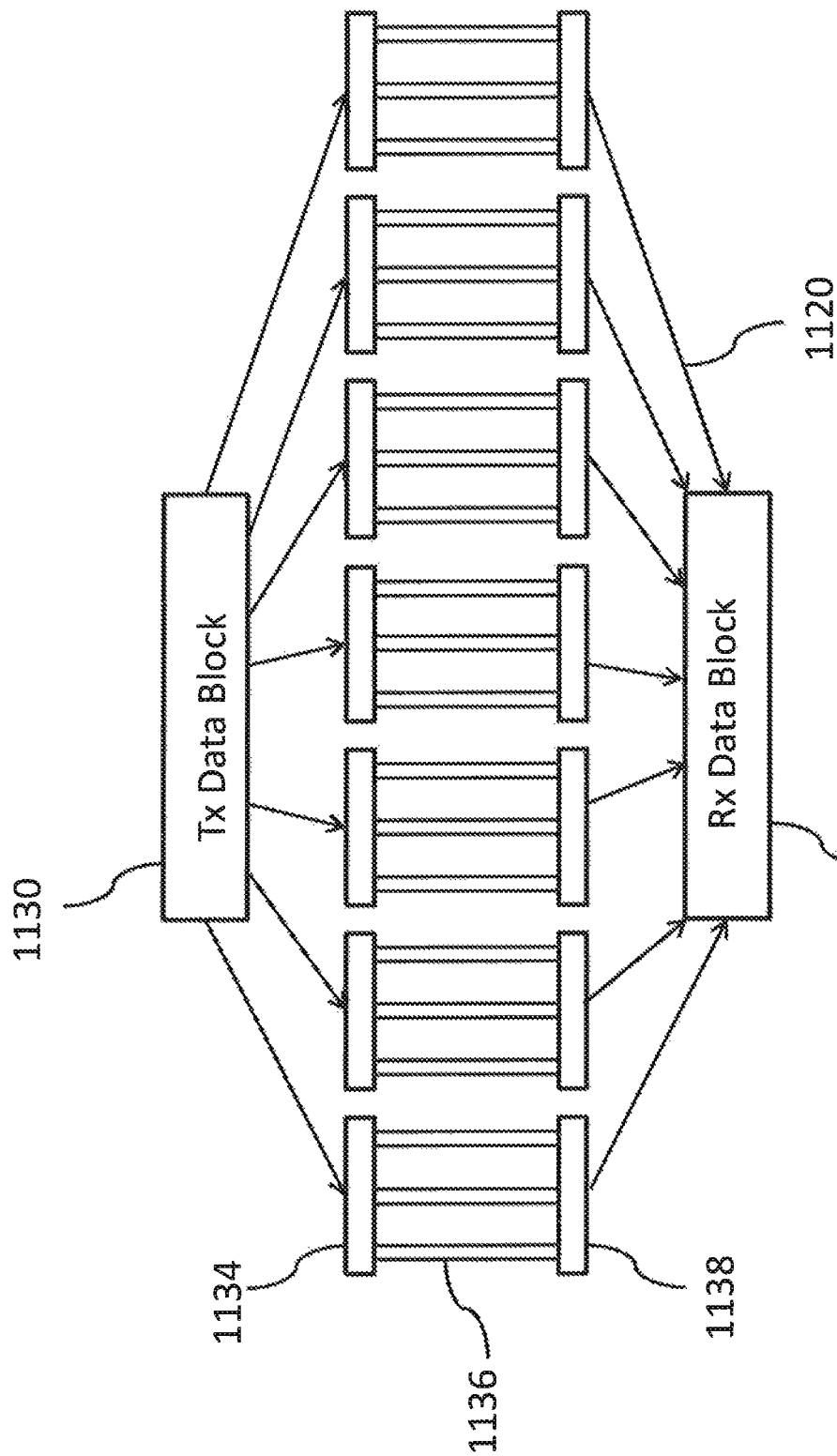
FIG. 30 is a picture of CTwists data flow.

In FIG. 30, the data flow from transmit to receive is illustrated. On the transmit side, based upon the error experience for the set of data channels 1136 being used and the data rate requirements of the client, a set of frames is created to be transmitted in parallel prepared for Forward Error Recovery. The plan is to use our dynamic Reed-Solomon error correcting code, such that, the amount of redundancy is adjusted appropriately based upon the error history. The Tx Data Block Processor 1130 takes an outbound data block and breaks it into Reed-Solomon frames to be transmitted in parallel. In a symbol generation module 1134, the frames are serially broken into symbols and transmitted over the parallel data channels 1136 which shows seven different data channels being transmitted over the three antenna array at different frequencies. The seven data channels receive activities from an FFT processing module 1138 that processes the symbols in parallel communicated on different frequencies (different channels) and use the symbols to re-build the frames to be processed by the Reed-Solomon function in the Rx Data Block 1132 which rebuilds the original data block. Note: error recovery is done at two levels 1) as each symbol is received the six different FFT results for complex CTwists symbol values are processed and the consensus determines the value returned; 2) at the Reed-Solomon level frame errors are detected and corrected. For super circular waves, only three FFT symbol results are available to determine a consensus. If no consensus is found, then a symbol error has occurred. The communication channel 1120 is where the frames flow to the Reed-Solomon error correcting code if too many errors are experienced, then an error is reported out of this level. Note: other Forward Error Recovery technologies other than Reed-Solomon are available and the same dynamic nature can be added to them.

F. Client Channel Management

Figure 31:
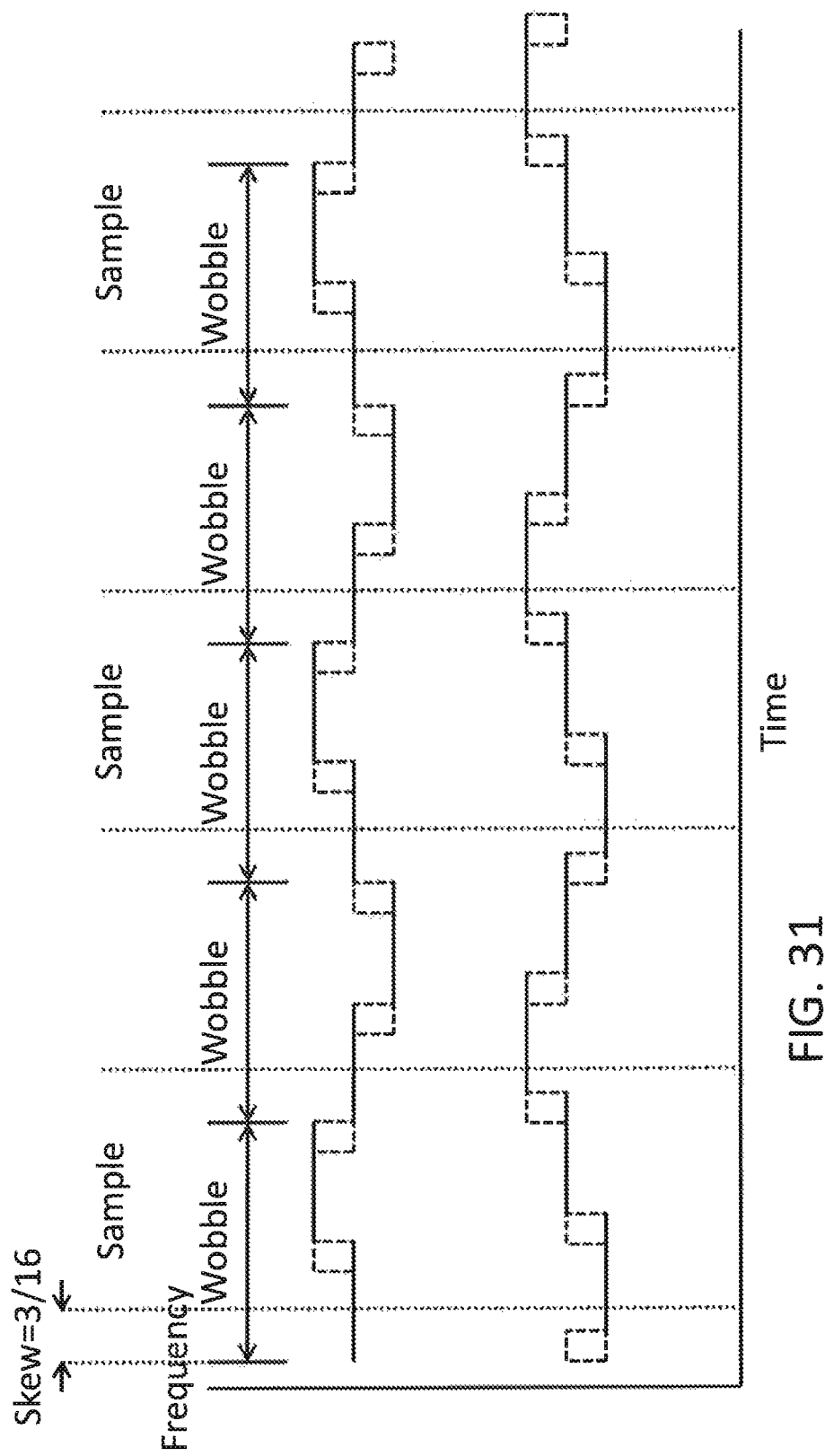
FIG. 31 is an example of reception of Wobble broadcast with skew drift.

One approach, as stated earlier, is for the server to broadcast two special cyclical broadcast channels with the wobble phasing, such that, the bottom wobble broadcast lags the top wobble broadcast by five eighths of a wobble as seen in FIG. 25. This allows the client to listen to the broadcasts for twice the 256 wobbles that represents a complete sample for every other wobble. By sampling every other wobble, the client will be able to process the FFT to determine the Skew of the sampling window and to adjust that Skew to be three sixteenth of a wobble. With the sampling window set at this value, variations due to client's movement can be evaluated by the calculated Skew drift over 256 of the standard sampling set of 256 wobbles. Note: the time for a wobble is set by the server's atomic clock (like the Microsemi CSAC SA.45s Chip Scale Atomic Clock) and is not effected by Doppler. As long as the client is moving less than 1900 miles per hour, the Skew drift will be less than the target Skew of three sixteenth as shown in FIG. 31. The Skew drift is one measure of the client's motion. Note: within the Skew window of a Skew of zero to a Skew of three eighths, the client can receive data properly. After the 256 sets of 256 wobbles (one fourth of a second) at digital finite impulse response (FIR) filter can accurately measure the apparent frequency (f') of the center of the top signal being broadcasted by the server. For stationary clients, the client's clock is simply synchronized with the server's clock. For mobile clients, this information along with the known server frequency (f) and the known speed of light (c), the client velocity relative to the server (v) can be calculated:

$$v=c*(1-(f/f'))$$

with this value a double check of the client velocity can be done with the measured Skew drift. These two calculations will allow for minor clock adjustments to the client's clock if is not yet stepping with the server's clock. The client's clock will be maintained with a Phased Locked Loop (PLL). Since the servers are synchronized with each other, once a client's clock is stepping with one server, then clock adjustment should not be required. When the client communicates with the server, the client's frequency must be adjusted by a factor calculated from the client's velocity vector relative to the server. Also the timing of the client transmissions are to be timed, such that, the server's sampling interval is properly met. Client service requests are submitted to the server on one of the designated server request line frequencies chosen through a hashing algorithm based upon the client's information.

The server response frequency is then monitored for a response. The request transmits credentials from the client for authorized usage validation and connection speed requests. The server response assigns the set of download and upload frequencies.

The client will receive data from the server on a shared channel and only process data addressed to the client and would only be able to decrypt data addressed to the client. The channel dedicated for client to server communication will remain open for durations needed by the client. The client to server channel reacquisition time requires a turn around with the server which encourages the maintaining of that channel until client to server communication goes relatively silent.

G. Multi-Server

In Multi-Server configurations, the servers coordinate several operations. First, the servers coordinate their clocks—stepping together. Second, the servers coordinate Client Communication—providing redundant communication with the client. Third, the servers coordinate Client Encryption—using shared keys for encrypting client data. Finally, the servers coordinate Security Channels—for encryption keys and identity information.

The data is kept in synchronization within gossip groups consisting of the client and the servers servicing the client. Through gossip what is known by one member becomes known by all. This ensures redundant secure communication. In multi-server implementations, the client connects with the two best servers for communication and uses three or more server clock broadcasts to determine (as it would with GPS) its location, speed, and acceleration. These servers will provide the needed data to create a highly accurate map for use with autonomous vehicles (self-driving cars) along with the needed reliable and secure communication.

H. Ultra Narrow Band Advantage

For the 2 GHz to 7 GHz frequency range the formula for required power is:

$$P_{dbm}=-165+10*\log_{10}(\text{bandwidth})$$

This represents a 17 dB reduction in power for a 200 Hz signal as compared to a 10 KHz signal and a 50 dB reduction in power for a 200 Hz signal as compared to a 20 MHz signal. Note: this is the 17 and 23 dB advantage calculated in the Power dB row of FIG. 28.

I. Clock Synchronization

The servers' clock will be driven by an atomic clock. A potential clock is the Microsemi CSAC SA.45s atomic clock. The servers will synchronize their clocks and step together.

The client will synchronize its clock with the server in one of two ways. First, for the stationary client a long term finite impulse response (FIR) filter on the center broadcast frequency (a known frequency) can be used to set the client's clock. Second, for a client with motion, two factors must be captured; namely, the value determined by a long term FIR for the center broadcast frequency which is affected by Doppler, and the exact time difference between two measurements to determine Skew separated by 256 wobbles repeated 256 times (the wobble is a known quantity not affected by Doppler). The second value is used to set the client's clock in conjunction with the Doppler adjustment determined by the first value.

V. Substance Detection and Manipulation

The CTwists waves, both the complex and the Super Circular, provide an opportunity to much more effectively use radio frequency substance detection. The complex CTwists wave penetrates much more effectively than conventional radio waves and delivers two different quantums of energy in the form of coupled photons of differing frequencies. These tend to be adsorbed together. The radio frequency range used in this approach has so many adsorption lines that it has been, in the past considered black body radiation (and any frequency adsorbed and any radiation out). Motion stops at absolute zero and increases with temperature. However, even at these low energy levels, everything is quantized. The CTwists Substance Detection and Manipulation depends upon the unique nature of the complex CTwists wave to 1) penetrate much better than normal radio waves and 2) to adsorb in a paired energy configuration. This unique pairing of frequencies and energy levels makes possible CTwists spectroscopic analysis.

A very important advantage is provided because the energy in this range is non-ionizing which means it does not cause physical harm. This is in contrast to ionizing radiation which can cause cancer or other ailments.

The approach is to use automated equipment to broadcast waves to excite a substance using Super Circular waves at different frequencies and wait and detect the radio wave emitted upon relaxation.

A. Initial Substance Scanner

Figure 32:
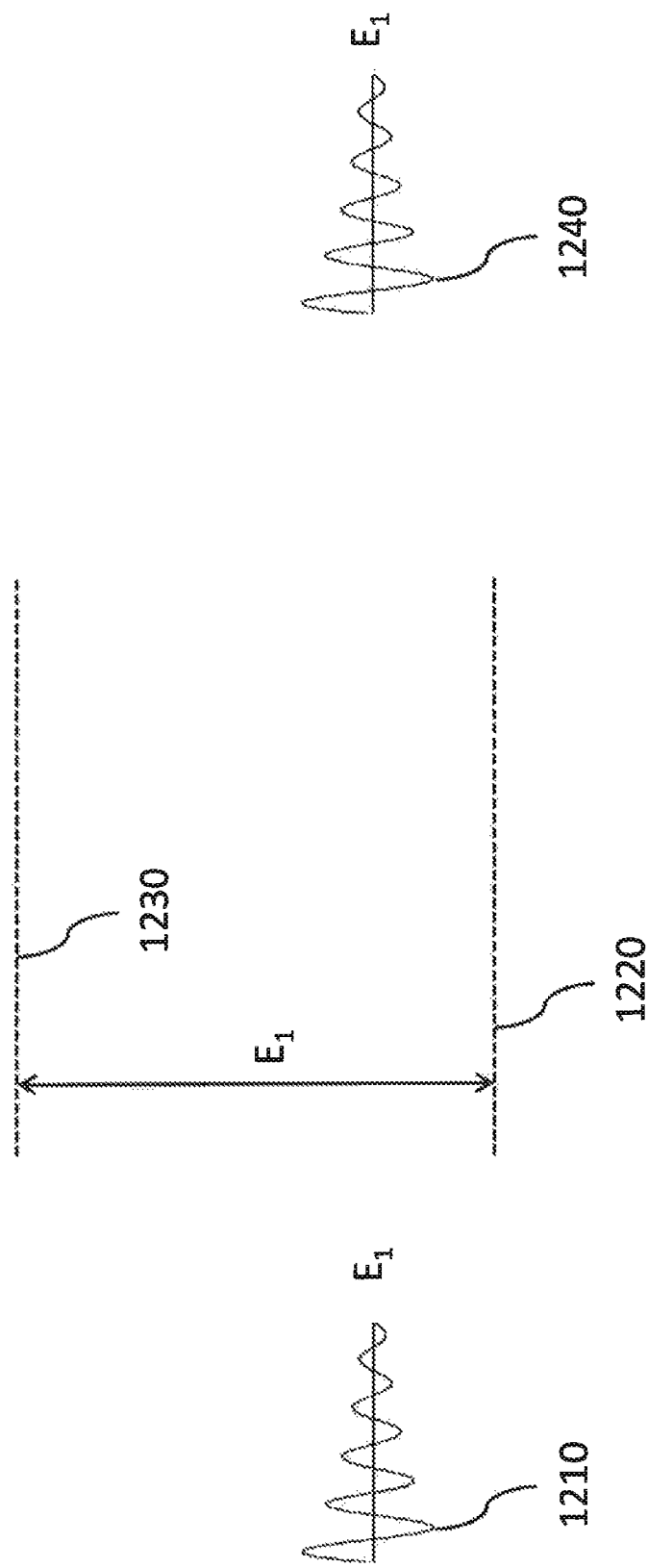
FIG. 32 is an example of simple substance excitation.

The purpose of this device is to methodically try to excite a substance with a range of radio frequencies using the Super Circular wave while monitoring for radio wave responses from the relaxation of the substance that matches the exciting wave. We are limiting the substance initial fingerprint to measurements where the frequency in (the energy of the photon) matches the energy out—the relaxation frequency matches the excitation frequency (the energy of the photon). FIG. 32 shows this scenario. Note: the waves in these figures are exemplary and not reflective of the actual waves. More particularly, an excitation wave 1210 is depicted. A change in energy level between an initial energy level 1220 and an excited energy level 1230 is next shown. An emitted wave 1240 is further depicted after relaxation. In doing so, the initial fingerprint of the substance is produced. The scanning activity should be done in an anechoic chamber with a Faraday cage to avoid background interference. Only the instances where the received wave's frequency, as seen in the FFT, matches the transmitted wave frequency are added to the fingerprint.

Figure 33:
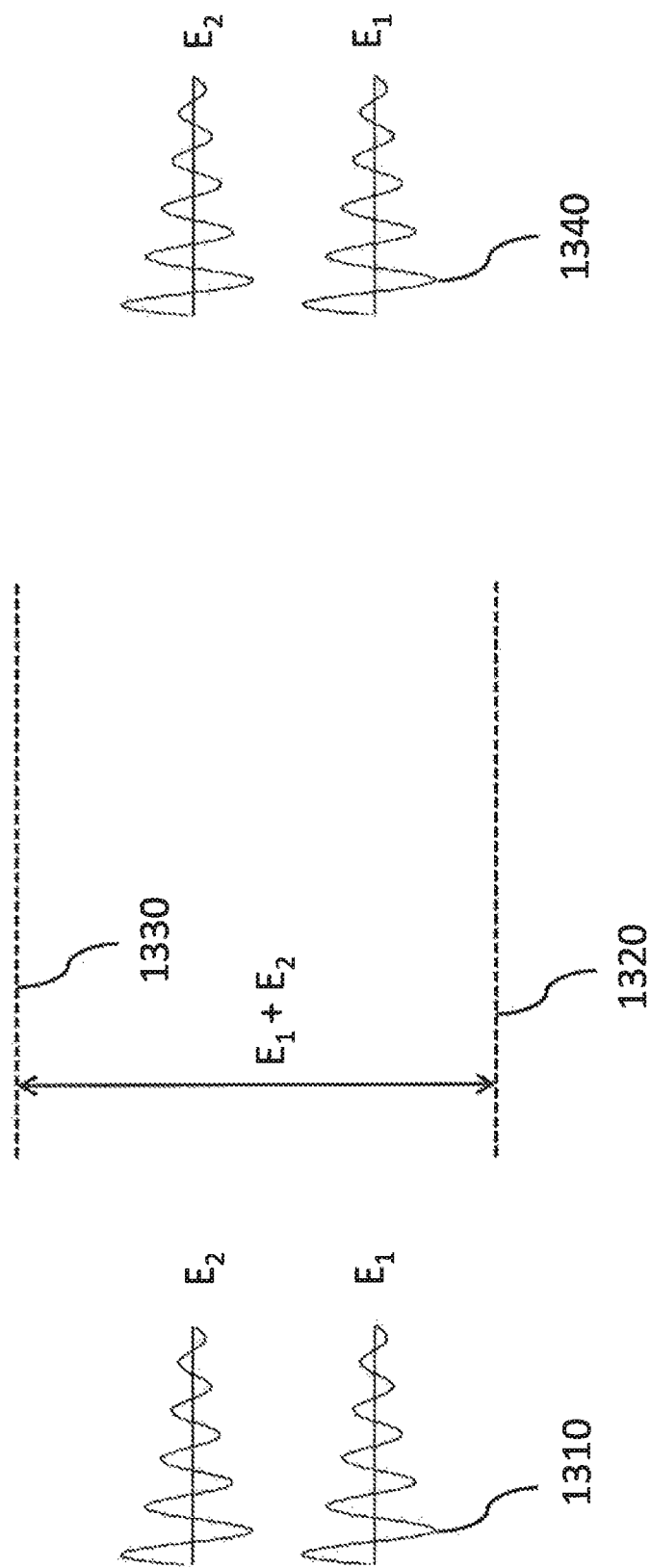
FIG. 33 is an example of CTwists simple substance excitation.

Once the first pass is done, using the response frequencies, complex CTwists waves are then tried by creating designer waves which use CTwists complex waves with their two peaks configured to match two of the frequencies cataloged in the first pass. When exciting with the designer wave, results are monitored for a relaxation signal whose FFT peaks map to pairs of these frequencies. FIG. 33 shows the use of a designer wave 1310, both at unexcited and excited levels of energy, used to excite the target substance from energy level 1320 to energy level 1330 with a photon pair of the designer wave. After relaxation, if the matching pair (correct FFT peaks) of photons is emitted from the emitted wave 1340, then the combination is a valid designer wave and is added to the fingerprint for the target object.

Figure 34:
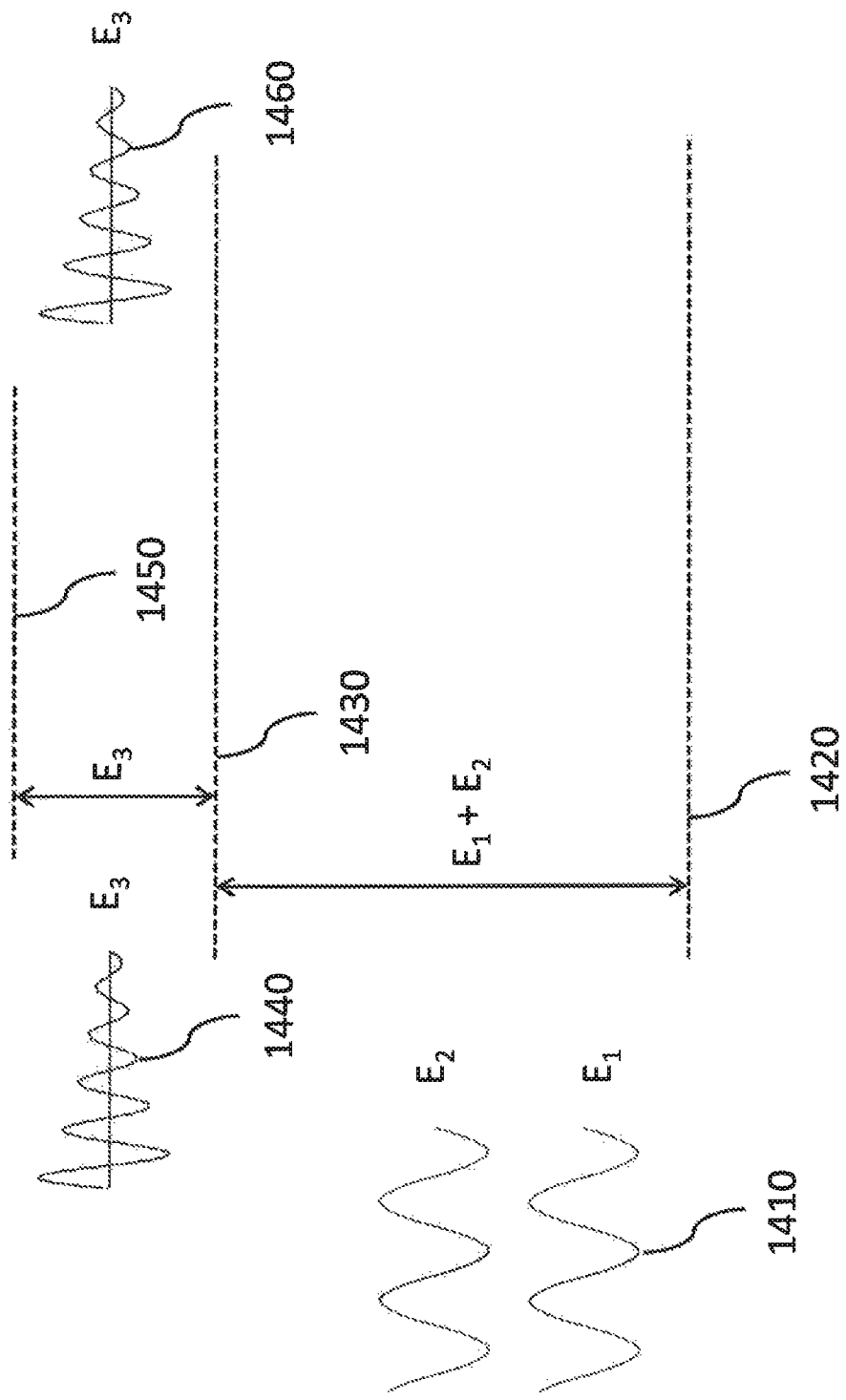
FIG. 34 is an example of simple second level substance excitation.

Once the designer waves that produce a complex response are determined, then additional scans will be done while designer waves of excitation frequencies are present. This will find higher excitation levels that can only be reached when the lower designer wave of excitation is present. FIG. 34 shows the use of a designer wave 1410 to excite a substance to a higher excitation level 1450 while testing that level for new excitation frequencies at that higher energy level 1430 above the base energy level 1420. These higher excitation levels will be added to the substance's fingerprint, if the resulting wave 1460 matches (or has the same FFT line) as the query wave 1440.

Figure 35:
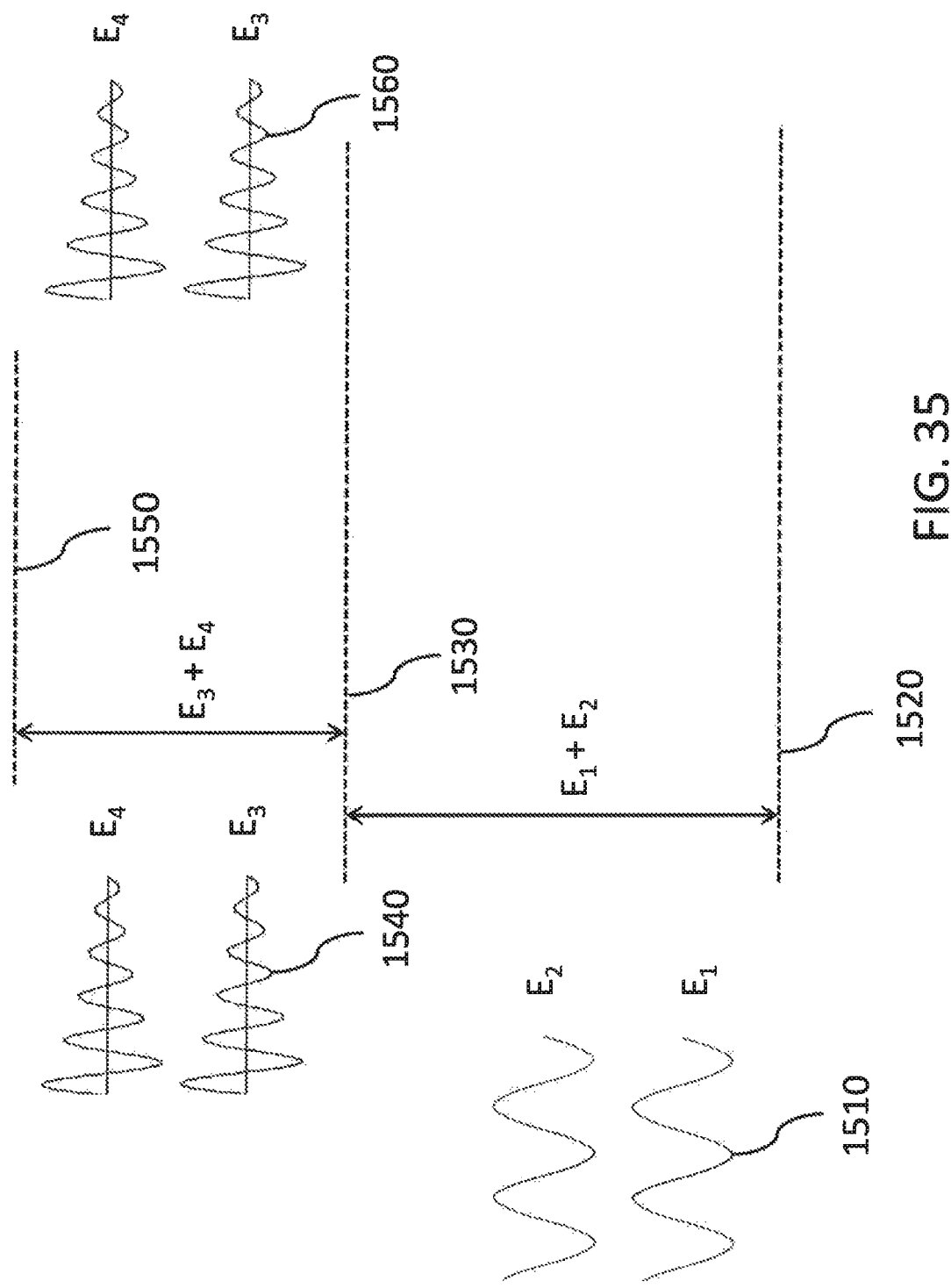
FIG. 35 is an example of CTwists second level substance excitation.

Once the single frequencies are mapped above the excited level, then pairs of these waves can be tested as potential second level designer waves. FIG. 35 shows the testing of potential second level designer waves. The excited level is maintained using designer wave 1510 which moves the energy level from 1520 to 1530. The wave pair 1540 is a second level designer wave candidate. If there is a resultant wave pair 1560 and the FFT lines match the expected frequencies as the relaxation of the higher excitation level 1550 occurs, then a second level designer wave has been found.

If necessary, this process can be done to additional levels.

The goal is to develop a fingerprint that is unique to the substance, so that, when the designer waves in the fingerprint are sent, only the target substance responds in a manner that matches the fingerprint.

B. Analysis Through Quantum Computational Chemistry

Where the substance's exact chemical composition is known, models can be used to predict the exact frequencies that would excite the substance and where designer waves would cause an excitement that would emit a designer wave response.

The secondary excitement levels can also be calculated. Note: the simulations are dependent on the type of solution in which the substance is suspended.

C. Substance Scanning and Detection Systems

Substance detection has many applications from entry portals to land mine detection, to cancer scanning, to contraband detection, and many more.

D. Portal Device

Figure 36B:
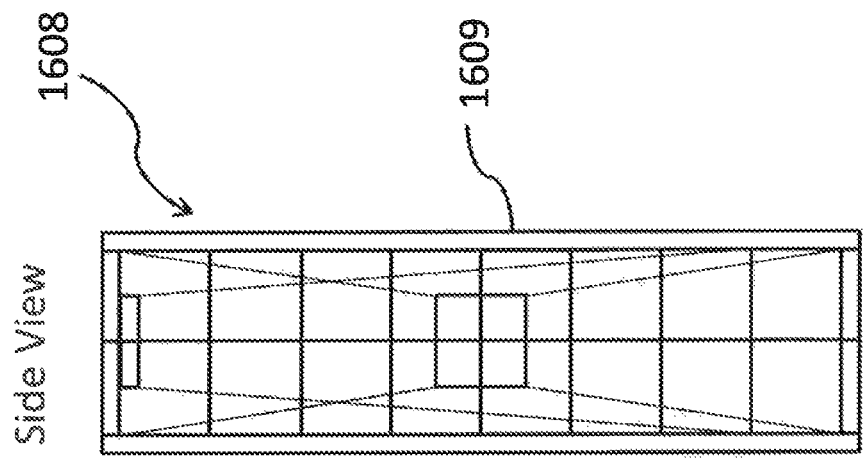
FIGS. 36A and 36B are a front view and a side view of an example portal substance detection system.
Figure 36A:
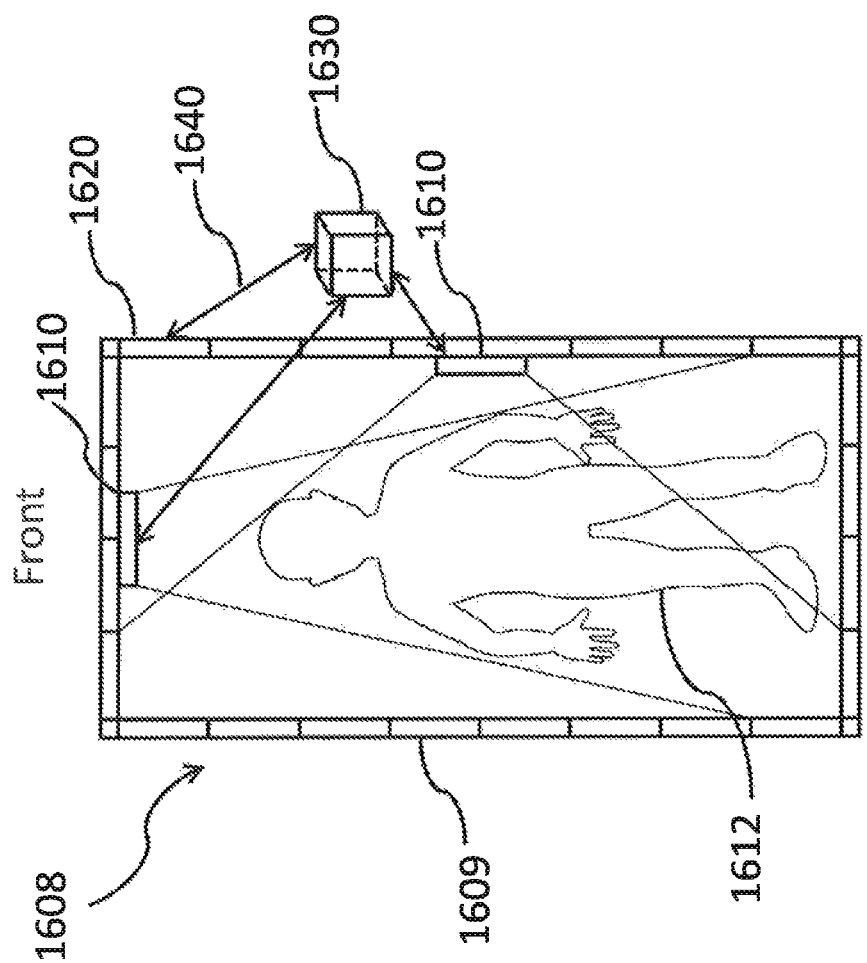

FIGS. 36A and 36B show one conceptual exemplary portal device 1608 which can be programmed to detect a wide range of substances. An array of transmitters 1610 are configured within device 1608 to excite a target substance, or object 1612 and upon relaxation, the receiving devices 1620 hear the signal if the substance is present. Note: for diagram simplification, only one receiving device 1620 is numbered. However, the portal device 1608 is surrounded by receivers 1620 on both sides of the encasement, or housing 1609, as well as on the top and bottom surfaces. A more detailed description of these antennas can be seen in FIGS. 38A and 38B and the control box 1630 can be seen in FIG. 19. Note: the control lines 1640 connect all the transmitters 1610 and receivers 1620 surrounding the portal to a system controller 1630 which is an array of control elements similar to system 708 of FIG. 19. One such system is provided for each transmitter, as well as each receiver.

E. Initial Scanning Chamber

FIG. 37 shows a portal device 1608 containing an initial scanning chamber 1650, showing the placement of a target substance, or object that needs to be scanned. An array of transmitting antennas 1610 and receiving antennas 1620 are provided about device 1608, although only a single transmitting antenna 1610 and receiving antenna 1620 is shown for purposes of simplification. The receiving antennas 1620 cover the side walls, as well as the top, and the bottom of the walls forming device 1608. The control lines 1640 connect all the transmitters 1610 and receivers 1620 surrounding the chamber to the control system module 1630 which is an array of control elements similar to an antenna transmitting and receiving process control system 728 of FIG. 19. One system 728 is provided for each transmitter, as well as each receiver.

F. Transmit and Receive Antennas

Figure 38A:
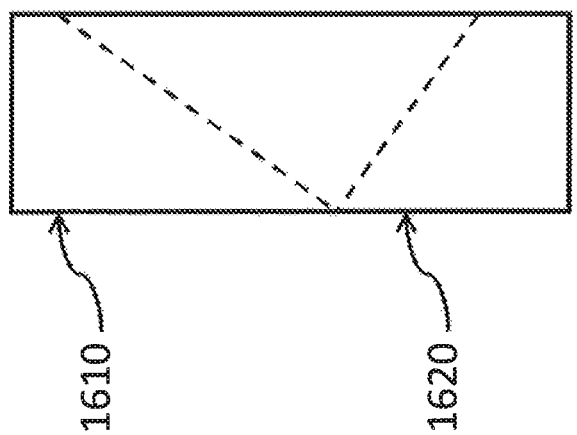
FIGS. 38A and 38B are a side view and a front view of an example transmit/receive antenna for either chamber or portal.
Figure 38B:
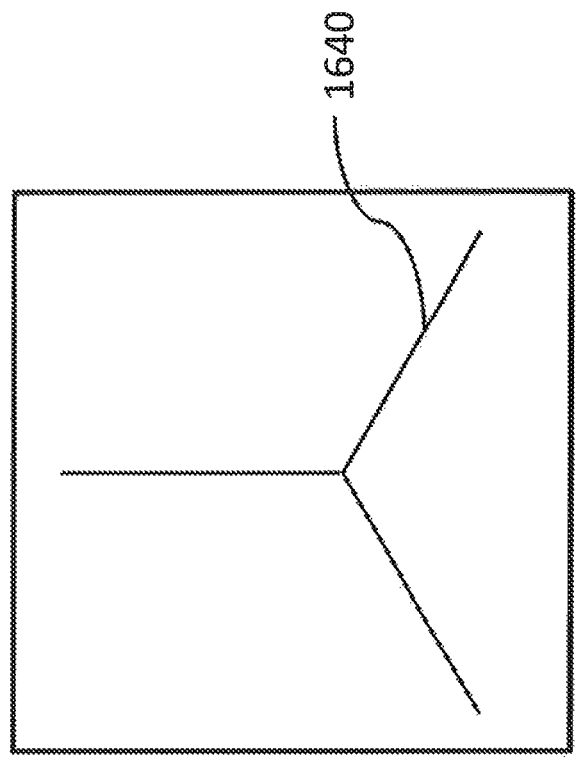

FIGS. 38A and 38B show a simplified drawing of one exemplary transmit and receive orthogonal antennas in an array 1640 for use with the portal and the initial scanning chamber of FIGS. 36A, 36B and 37, respectively, as a transmitting device 1610 and optionally a receiving device 1620. For a land mine detector, FIGS. 40A and 40B show an alternative round antenna complex, as described below in greater detail.

G. Land Mine Detector

Figure 39:
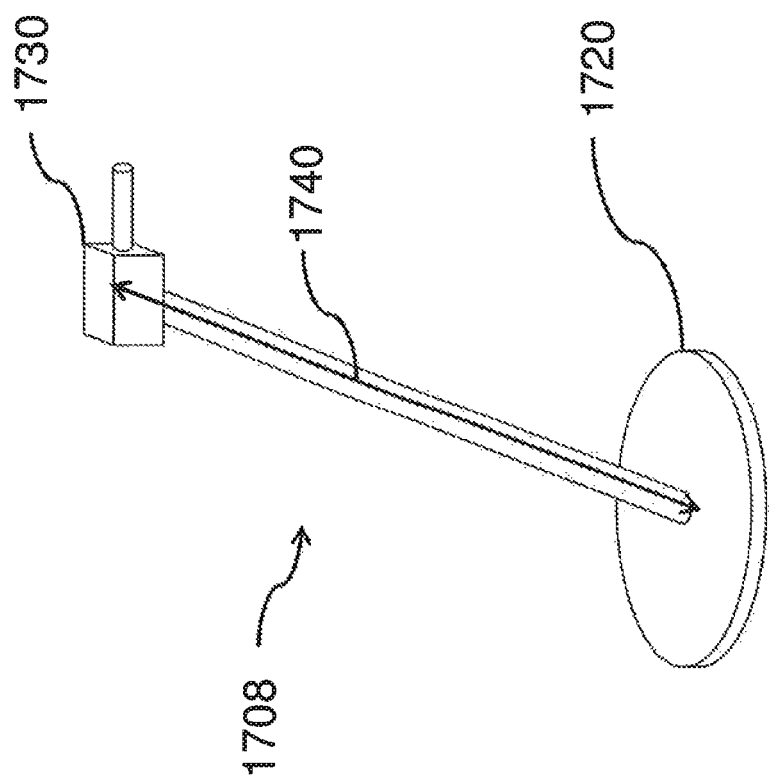
FIG. 39 is an example land mine detector.

FIG. 39 shows a simplified exemplary diagram of a land mine detector 1708. Land mine detector 1708 includes a control system module 1730, similar to module 1630, along with control lines, and a round antenna 1720 described below in greater detail with reference to FIGS. 40A and 40B.

Figure 40A:
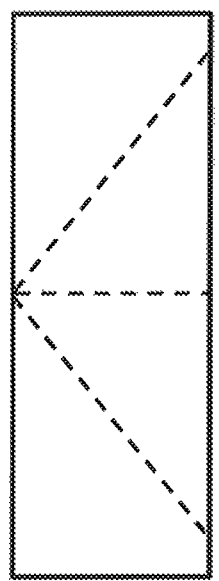
FIGS. 40A and 40B are a top view and a front view of an example antenna for the land mine detector.
Figure 40B:
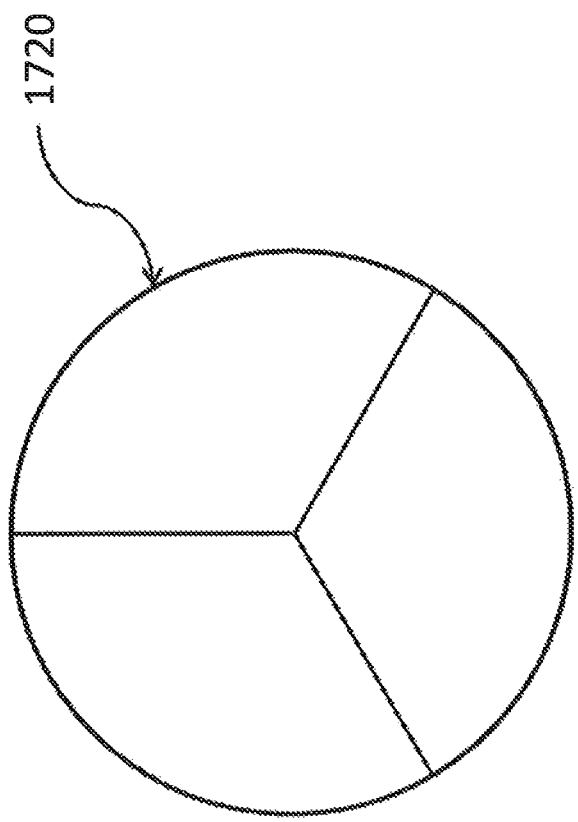

FIGS. 40A and 40B illustrate a round antenna array 1720 that contains an orthogonal array of antennas, similar to array 1640 in FIG. 38B.

H. Substance Destruction

As with water molecules in a microwave oven, forced oscillations of a substance can be achieved by transmitting at higher power for longer durations at the determined designer frequencies as compared to what detection would require. Using this technique, a substance can be either brought to a boil or caused to break apart.

It is understood that various applications can be made using the apparatus and method described above.

A digital information transmission apparatus can be provided having an antenna, a signal transmission medium, a transmitter, a digital signal generator, and a clock. The transmitter is coupled with the antenna and is configured to generate and transmit a continuous wave over the transmission medium. The digital signal generator cooperates with the transmitter and is configured to encode a digital configuration state change to the continuous wave detectable at a receiving end as a digital data stream. The clock has a sampling frequency at least twice a Nyquist sampling frequency for the continuous wave coupled with the transmitter and the digital signal generator and is configured to synchronize time between the transmitter and a receiver.

A digital information transmission apparatus is provided having an antenna, a signal transmission medium, a transmitter, a digital signal generator, and a clock. The transmitter is coupled with the antenna and is configured to generate and transmit a continuous wave over the transmission medium. The digital signal generator cooperates with the transmitter and is configured to encode a digital configuration state change to the continuous wave detectable at a receiving end as a digital data stream. The clock has an accuracy that supports at least twice a Nyquist sampling frequency for the rate of change of digital configuration state of the carrier frequency signal coupled with the transmitter and the digital signal generator and is configured to synchronize time between the transmitter and a receiver.

In compliance with the statute, the various embodiments have been described in language more or less specific as to structural and methodical features. It is to be understood, however, that the various embodiments are not limited to the specific features shown and described, since the means herein disclosed comprise disclosures of putting the various embodiments into effect. The various embodiments are, therefore, claimed in any of its forms or modifications within the proper scope of the appended claims appropriately interpreted in accordance with the doctrine of equivalents.

What is claimed is:

1. An apparatus for transmitting digital information, comprising:
a plurality of antennas having polarization diversity; and
a plurality of signal generators each coupled to one of the antennas and configured to: a) drive the antennas to generate a transmission wave comprising a continuous twisted wave having a carrier frequency and a twist frequency lower than the carrier frequency; and b) encode digital information on the continuous twisted wave by shifting the carrier wave between a first carrier frequency and a second carrier frequency.

2. The apparatus of claim 1, wherein each of the signal generators is configured to encode digital information via shifting by smoothly transitioning between the first carrier frequency and the second carrier frequency with phase adjustment configured to maintain power transition such that as one of the first and second frequencies drops power to zero another of the first and second frequencies brings its power up so that the total power stays the same.

3. The apparatus of claim 2, wherein individual pairs of the antennas cooperate to provide a respective crossed dipole antenna.

4. The apparatus of claim 2, wherein the plurality of antennas form an array of three orthogonal antennas.

5. The apparatus of claim 4, further comprising a horn waveguide, wherein the array of three orthogonal antennas is supported in the horn waveguide to form a horn antenna.

6. The apparatus of claim 1, further comprising an upconvert amplifier and a circulator interposed between each one of the plurality of antennas and a respective one of the plurality of signal generators.

7. The apparatus of claim 1, further comprising a parabolic reflector carried behind the plurality of antennas.

8. The apparatus of claim 1, further comprising a server, wherein the server transmits periodic signals such that, as one frequency drops in power, the second frequency increases in power to realize a total combined power between the first frequency and the second frequency that stays constant.

9. The apparatus of claim 1, further comprising a client communicating with the plurality of antennas, a plurality of signal receivers, and a server communicating with the plurality of signal receivers, wherein the client transmits a connection request through a request line with frequency determined through a hashing algorithm based upon information about the client within a request window of the server.

10. The apparatus of claim 1, further comprising a client communicating with the plurality of antennas, a plurality of signal receivers, and a server communicating with the plurality of signal receivers, wherein the server receives a request for connection from the client on a request line and transmits frequency allocations for the client for server-to-client frequency and client-to server frequency on a response frequency to the client.

11. The apparatus of claim 10, wherein the client requests connection at specific server-to-client and client-to-server data rates.

12. The apparatus of claim 10, wherein the server grants client requests for connection at specific server-to-client and client-to-server data rates based upon authorized usage for the client.

13. The apparatus of claim 10, wherein the server deallocates the client-to-server frequency when the client communication goes relatively silent.

14. The apparatus of claim 10, wherein the server receives another request for connection from the client upon resumption of activity through a request frequency for the client.

15. The apparatus of claim 10, wherein the server monitors channel error rates from both experience of the server and error experiences reported from the client which allows the server to use error history of the error experiences to allocate least error prone channels first and set redundancy in assigned forward error correction.

16. An apparatus for receiving digital information, comprising:
a plurality of antennas having polarization diversity; and
a plurality of signal receivers each having a Fast Fourier Transform (FFT) processor, each signal receiver coupled to one of the antennas, the plurality of antennas and signal receivers configured to receive a captured wave comprising a continuous twisted wave having a carrier frequency and a twist frequency lower than the carrier frequency as an output signal from each of the antennas to decode digital information on the continuous twisted wave in the form of shifts between a first carrier frequency and a second carrier frequency.

17. The apparatus of claim 16, wherein each signal receiver of the plurality of signal receivers is configured to decode digital information via shifting by smoothly transitioning between the first carrier frequency and the second carrier frequency with phase adjustment in a manner that maintains power transition such that as one of the first and second carrier frequencies drops power to zero another of the first and second carrier frequencies brings its power up so that the total power stays the same.

18. The apparatus of claim 17, wherein the plurality of antennas is an array of three orthogonal antennas.

19. The apparatus of claim 17, further comprising a horn antenna, wherein the plurality of antennas are aligned in the horn antenna.

20. The apparatus of claim 17, further comprising a parabolic reflector, the plurality of antennas supported centrally in front of the parabolic reflector.

21. The apparatus of claim 16, further comprising a client communicating with the plurality of antennas and a server communicating with the plurality of signal receivers, wherein the client periodically samples a broadcast signal for the server such that a clock and a request window for the client is set to match a clock and a request window for the server.

22. The apparatus of claim 16, further comprising a client communicating with the plurality of antennas and a server communicating with the plurality of signal receivers, wherein the server monitors client channels for noise and uses noise experience to allocate least noisy channels first.

23. The apparatus of claim 16, further comprising a Symbol Processing Module, wherein the Fast Fourier Transform (FFT) processor of the respective one of the receivers decodes periodically sampled signals to determine a received symbol which is passed to the Symbol Processing Module which determines a consensus for the received symbol.

24. The apparatus of claim 23, further comprising an Inbound Block Processing Module, wherein the Inbound Block Processing Module assembles the received symbols into respective blocks and processes forward error correction for the respective blocks.

25. A method of creating a transmission wave, comprising:
providing a plurality of orthogonal antennas;
generating a continuous twisted wave having a twist frequency and a carrier frequency, the twist frequency lower than or equal to the carrier frequency, by driving each of the antennas using independent, coordinated, and distinct sinusoidal waves; and encoding digital information on the continuous twisted wave by shifting between a first carrier frequency and a second carrier frequency.

26. The method of claim 25, wherein the plurality of orthogonal antennas is comprised of two antennas provided in orthogonal relationship.

27. The method of claim 26, wherein the two antennas cooperate to provide a crossed dipole antenna.

28. The method of claim 25, wherein the plurality of orthogonal antennas is comprised of three antennas provided in orthogonal relationship.

29. A method of transmitting digital information, comprising:
generating a transmission wave comprising a continuous twisted wave having a carrier frequency and a twist frequency lower than the carrier frequency; and
encoding digital information on the continuous twisted wave by shifting the carrier frequency between a first carrier frequency and a second carrier frequency;
wherein shifting comprises smoothly transitioning between the first carrier frequency and the second carrier frequency with phase adjustment in a manner that maintains power transition such that as one of the first and second carrier frequencies drops power to zero another of the first and second carrier frequencies brings its power up so that the total power stays the same.

30. The method of claim 29, wherein generating comprises energizing an array of three orthogonal antennas.

31. The method of claim 29, wherein generating a transmission wave comprises generating a circular wave.

32. The method of claim 29, wherein generating a transmission wave comprises generating a horizontal polarized wave.

33. The method of claim 29, wherein generating a transmission wave comprises generating a vertical polarized wave.

34. An apparatus for capturing a transmission wave, comprising:
a plurality of orthogonal antennas;
a plurality of signal receivers each having a Fast Fourier Transform (FFT) processor, each signal receiver coupled to one of the antennas, the plurality of antennas and signal receivers configured to receive a captured wave comprising a continuous twisted wave and having a twist frequency and a carrier frequency, the twist frequency lower than or equal to the carrier frequency;
a server communicating with the plurality of orthogonal antennas; and
a client communicating with the server;
wherein the client periodically samples a broadcast signal for the server such that the client sets a clock and a request window for the client to match a clock and a request window for the server.

35. The apparatus of claim 34, wherein a pair of the orthogonal antennas cooperate to provide a crossed dipole antenna.

36. The apparatus of claim 34, wherein the orthogonal antennas cooperate to form an array of three orthogonal antennas.

37. An apparatus for generating a transmission wave, comprising:
- a plurality of orthogonal antennas;
- a plurality of signal generators each coupled to one of the antennas and configured to generate a twisted wave by independently driving each of the antennas using phase coordinated information waves, and having a twist frequency and a carrier frequency, the twist frequency lower than or equal to the carrier frequency;
- a server communicating with the plurality of orthogonal antennas; and
- a client communicating with the server;
- wherein the client transmits a connection request through a request line with frequency determined through a hashing algorithm based upon information about the client within a request window of the server.

38. The apparatus of claim 37, wherein the server has a first broadcast channel and a second broadcast channel unique from the first broadcast channel.

39. The apparatus of claim 37, wherein the client has a first request channel and a second request channel unique from the first request channel.

40. An apparatus for generating a transmission wave, comprising:
- a plurality of orthogonal antennas;
- a plurality of signal generators each coupled to one of the antennas and configured to generate a twisted wave by independently driving each of the antennas using phase coordinated information waves, and having a twist frequency and a carrier frequency, the twist frequency lower than or equal to the carrier frequency;
- a server communicating with the plurality of orthogonal antennas; and
- a client communicating with the server;
- wherein the server receives a request for connection from the client on a request line and transmits frequency allocations to the client for server-to-client frequency and client-to-server frequency on a response frequency from the server.

41. The apparatus of claim 40, wherein the client requests connection at specific server-to-client and client-to-server data rates.

42. The apparatus of claim 40, wherein the server grants client requests for connection at specific server-to-client and client-to-server data rates based upon authorized usage of the client.

43. The apparatus of claim 40, wherein the server deallocates the client-to-server frequency when the client communication goes relatively silent.

44. The apparatus of claim 40, wherein the server receives another request for connection from the client upon resumption of activity through a request frequency for the client.

45. The apparatus of claim 40, wherein the server monitors channel error rates from both experience of the server and error experiences reported from the client which allows the server to use an error history to allocate least error prone channels first and set redundancy in assigned forward error correction.

* * * * *

UNITED STATES PATENT AND TRADEMARK OFFICE
CERTIFICATE OF CORRECTION

| | | |
|---|---|---|
| PATENT NO. | : 10,804,997 B2 | Page 1 of 1 |
| APPLICATION NO. | : 15/892939 | |
| DATED | : October 13, 2020 | |
| INVENTOR(S) | : Carl Edmund Porter | |

It is certified that error appears in the above-identified patent and that said Letters Patent is hereby corrected as shown below:

On the Title Page

(73) Assignee: – Replace "Ctwists, LLC" with --CTwists, LLC--

Signed and Sealed this
Fourth Day of February, 2025

Coke Morgan Stewart
*Acting Director of the United States Patent and Trademark Office*